US012632734B2

(12) United States Patent
Riazi et al.

(10) Patent No.: US 12,632,734 B2
(45) Date of Patent: May 19, 2026

(54) OBLIVIOUS BINARY NEURAL NETWORKS

(71) Applicant: The Regents of the University of California, Oakland, CA (US)

(72) Inventors: Mohammad Sadegh Riazi, San Diego, CA (US); Farinaz Koushanfar, San Diego, CA (US); Mohammad Samragh Razlighi, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 1323 days.

(21) Appl. No.: 17/423,088

(22) PCT Filed: Jan. 17, 2020

(86) PCT No.: PCT/US2020/014211

§ 371 (c)(1),
(2) Date: Jul. 14, 2021

(87) PCT Pub. No.: WO2020/150678

PCT Pub. Date: Jul. 23, 2020

(65) Prior Publication Data

US 2022/0083865 A1     Mar. 17, 2022

Related U.S. Application Data

(60) Provisional application No. 62/794,474, filed on Jan. 18, 2019.

(51) Int. Cl.
| | |
|---|---|
| *G06N 3/082* | (2023.01) |
| *G06F 21/71* | (2013.01) |
| *G06N 3/04* | (2023.01) |

(52) U.S. Cl.
CPC ............. *G06N 3/082* (2013.01); *G06F 21/71* (2013.01); *G06N 3/04* (2013.01)

(58) Field of Classification Search
CPC ............................... G06F 21/71; G06N 3/082
See application file for complete search history.

(56) References Cited

U.S. PATENT DOCUMENTS

| | | |
|---|---|---|
| 2016/0350648 A1 | 12/2016 | Gilad-Bachrach et al. |
| 2017/0372226 A1 | 12/2017 | Costa et al. |
| 2021/0209247 A1* | 7/2021 | Mohassel ............. A63B 21/023 |

OTHER PUBLICATIONS

Abdelouahab, "Accelerating CNN inference on FPGAs: A Survey", 2018 (Year: 2018).*

(Continued)

*Primary Examiner* — Van C Mang
(74) *Attorney, Agent, or Firm* — FisherBroyles, LLP

(57) ABSTRACT

A framework is presented that provides a shift in the conceptual and practical realization of privacy-preserving interference on deep neural networks. The framework leverages the concept of the binary neural networks (BNNs) in conjunction with the garbled circuits protocol. In BNNs, the weights and activations are restricted to binary (e.g., ±1) values, substituting the costly multiplications with simple XNOR operations during the inference phase. The XNOR operation is known to be free in the GC protocol; therefore, performing oblivious inference on BNNs using GC results in the removal of costly multiplications. The approach consistent with implementations of the current subject matter provides for oblivious inference on the standard DL benchmarks being performed with minimal, if any, decrease in the prediction accuracy.

13 Claims, 13 Drawing Sheets

(56)        References Cited

OTHER PUBLICATIONS

Abadi, M. et al., "Tensorflow: A system for large-scale machine learning." In Operating Systems Design and Implementation (OSDI), 2016.

Asharov, G. et al., "More efficient oblivious transfer and extensions for faster secure computation." In CCS, 2013.

Beaver, D. "Correlated pseudorandomness and the complexity of private computations." In STOC, 1996.

Bellare, M. et al., "Efficient garbling from a fixed-key blockcipher." In IEEE S&P, 2013.

Brakerski, Z. et al., "(Leveled) fully homomorphic encryption without bootstrapping." ACM Transactions on Computation Theory (TOCT), 6(3):13, 2014.

Brakerski, Z. et al., "Efficient fully homomorphic encryption from (standard) lwe." SIAM journal on Computing, 43(2):831-871, 2014.

Chandran, N. et al., "EzPC: Programmable, efficient, and scalable secure two-party computation." IACR Cryptology ePrint Archive, Nov. 9, 2017, 2017.

Courbariaux, M. et al., "Binarized neural networks: Training deep neural networks with weights and activations constrained to+ 1 or-1." arXiv preprint arXiv:1602.02830, 2016.

Dowlin, N. et al., "CryptoNets: Applying neural networks to encrypted data with high throughput and accuracy." In ICML, 2016.

Fredrikson, M. et al., "Model inversion attacks that exploit confidence information and basic countermeasures." In CCS. ACM, 2015.

Goldreich, O. et al., "How to play any mental game." In Proceedings of the nineteenth annual ACM symposium on Theory of computing, pp. 218-229. ACM, 1987.

Huang, Y. et al., "Amortizing garbled circuits." In International Cryptology Conference, pp. 458-475. Springer, 2014.

Huang, Y. et al., "Efficient secure two-party computation using symmetric cut-and-choose." In Advances in Cryptology—Crypto 2013, pp. 18-35. Springer, 2013.

Ishai, Y. et al., "Extending oblivious transfers efficiently." In Annual International Cryptology Conference, pp. 145-161. Springer, 2003.

Kingma, D. P. et al., "Adam: A method for stochastic optimization." arXiv preprint arXiv:1412.6980, 2014.

Kolesnikov, V. et al., "Duplo: unifying cut-and-choose for garbled circuits." In Proceedings of the 2017 ACM SIGSAC Conference on Computer and Communications Security, pp. 3-20. ACM, 2017.

Kolesnikov, V. et al., "Improved garbled circuit: Free XOR gates and applications." In ICALP, 2008.

Lindell, Y. "Fast cut-and-choose-based protocols for malicious and covert adversaries." Journal of Cryptology, 29(2):456-490, 2016.

Lindell, Y. et al., "A proof of security of Yao's protocol for two-party computation." Journal of Cryptology, 22(2):161-188, 2009.

Lindell, Y. et al., "Secure two-party computation via cut-and-choose oblivious transfer." Journal of Cryptology, 25(4):680-722, 2012.

Liu, J. et al., "Oblivious neural network predictions via MiniONN transformations." In CCS, 2017.

Mohassel, P. et al., "SecureML: A system for scalable privacy-preserving machine learning." In IEEE S&P, 2017.

Molchanov et al., "Pruning Convolutional Neural Networks for Resource Efficient Transfer Learning." In Cornell University Library/ Computer Science/Computer Vision and Pattern Recognition. Nov. 19, 2016.

Naor, M. et al., "Privacy preserving auctions and mechanism design." In ACM Conference on Electronic Commerce, 1999.

Paillier, P. "Public-key cryptosystems based on composite degree residuosity classes." In International Conference on the Theory and Applications of Cryptographic Techniques, pp. 223-238. Springer, 1999.

Rabin, M. O. "How to exchange secrets with oblivious transfer." IACR Cryptology ePrint Archive, 2005:187, 2005.

Rastegari et al., "XNOR-Net: ImageNet Classification Using Binary Convolutional Neural Networks." In Cornell University Library/ Computer Science/Computer Vision and Pattern Recognition. Mar. 16, 2016.

Riazi, M. S. et al., "Chameleon: A hybrid secure computation framework for machine learning applications." In ASIACCS'18, 2018.

Romero, A. et al., "Fitnets: Hints for thin deep nets." arXiv preprint arXiv:1412.6550, 2014.

Rouhani, B. D. et al., "DeepSecure: Scalable provably-secure deep learning." DAC, 2018.

Shokri, R. et al., "Membership inference attacks against machine learning models." In S&P. IEEE, 2017.

Simonyan, K. et al., "Very deep convolutional networks for large-scale image recognition." arXiv preprint arXiv:1409.1556, 2014.

Songhori, E. M. et al., "TinyGarble: Highly compressed and scalable sequential garbled circuits." In IEEE S&P, 2015.

Szegedy, C. et al., "Going deeper with convolutions." Cvpr, 2015.

Tramer, F. et al., "Stealing machine learning models via prediction APIs." In USENIX Security, 2016.

Yao, A. "How to generate and exchange secrets." In FOCS, 1986.

Zahur, S. et al., "Two halves make a whole." In Eurocrypt, 2015.

* cited by examiner

600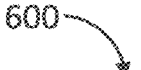

Sender:
  (1) Bit-extends all elements of $\mathbf{v}_1$ and creates $\mathbf{v}_1^*$
  (2) Creates two's complement of $\mathbf{v}_1^*$ : $\overline{\mathbf{v}_1^*}$
  (3) Creates random vector $\mathbf{r}$ : same size as $\overline{\mathbf{v}_1^*}$
  (4) Creates list of first messages as $\mathbf{m}^2 = \overline{\mathbf{v}_1^*} - \mathbf{r} \bmod 2^{b'}$
  (5) Creates list of second messages as $\mathbf{m}^1 = \mathbf{v}_1^* - \mathbf{r} \bmod 2^{b'}$

Sender & Receiver:
  (6) Parties engage in Oblivious Transfer (OT)
     Sender puts $\mathbf{m}^1$ and $\mathbf{m}^2$ as message vectors
     Receiver puts $\mathbf{v}_2$ vector as selection bits

Receiver:
  (7) Gets vector $\mathbf{v}_t$ where:

$$\mathbf{v}_t[i] = \begin{cases} \overline{\mathbf{v}_1^*}[i] - \mathbf{r}[i] \bmod 2^{b'} & (\text{if } \mathbf{v}_2[i] = 0) \\ \mathbf{v}_1^*[i] - \mathbf{r}[i] \bmod 2^{b'} & (\text{if } \mathbf{v}_2[i] = 1) \end{cases}$$

Sender:
  (8) Computes her additive share of VDP result as:

$$y_1 = \sum_{i=1}^{n} \mathbf{r}[i] \bmod 2^{b'}$$

Receiver:
  (9) Computes his additive share of VDP result as:

$$y_2 = \sum_{i=1}^{n} \mathbf{v}_t[i] \bmod 2^{b'}$$

```
1   INPUT 28 1 8
2   CONV 5 16 1 0 OCA
3   ACT
4   MAXPOOL 2
5   CONV 5 16 1 0
6   ACT
7   MAXPOOL 2
8   FC 100
9   ACT
10  FC 10
```

```
Description:

INPUT #input_feature #channels #bit-length

CONV #filter_size #filters #stride
        #Pad #OCA (optional)

MAXPOOl #window_size

FC #output_neurons
```

FIG. 8

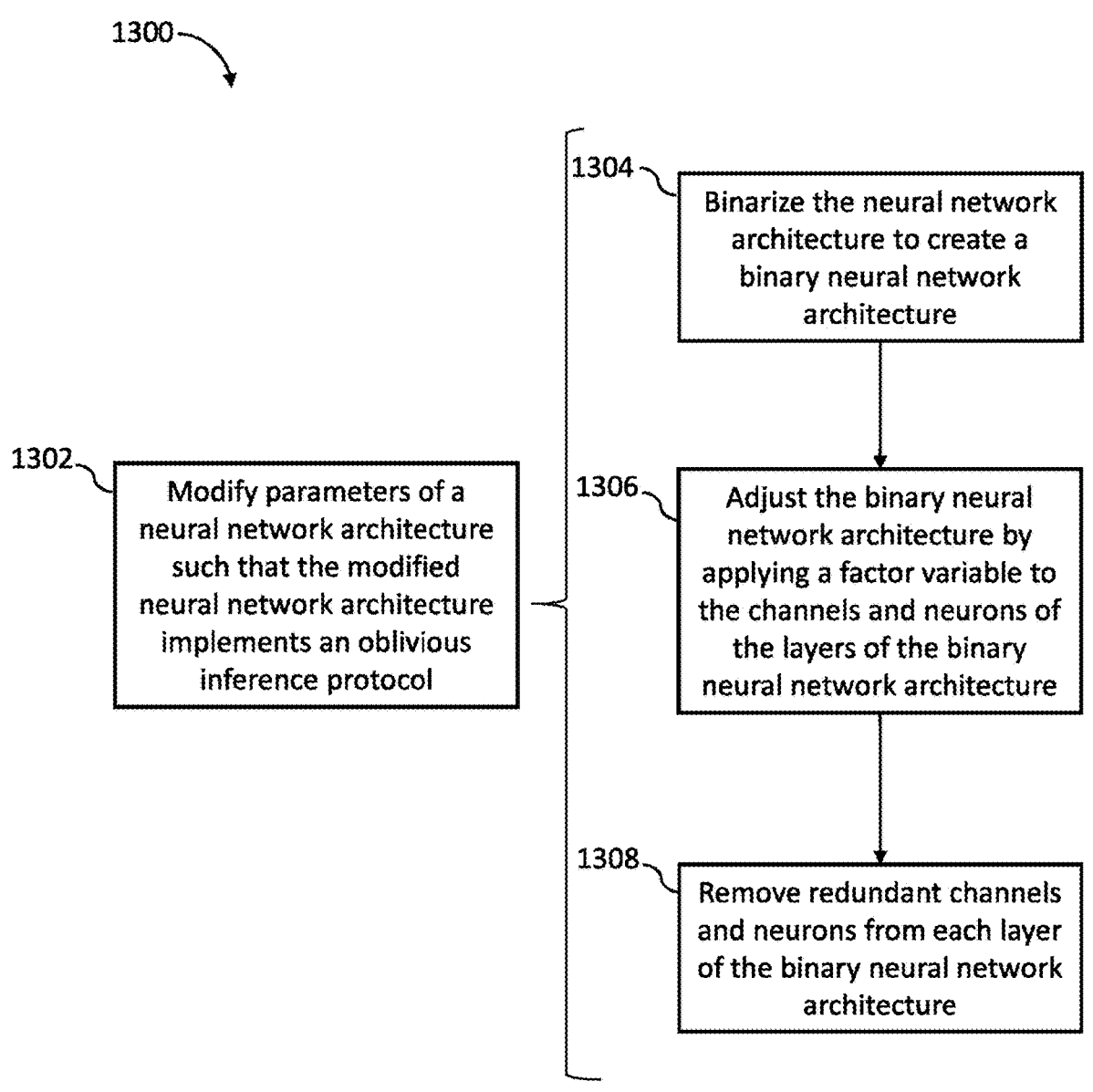

1300

1302 — Modify parameters of a neural network architecture such that the modified neural network architecture implements an oblivious inference protocol 1304 — Binarize the neural network architecture to create a binary neural network architecture 1306 — Adjust the binary neural network architecture by applying a factor variable to the channels and neurons of the layers of the binary neural network architecture 1308 — Remove redundant channels and neurons from each layer of the binary neural network architecture

FIG. 13

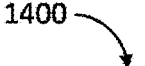
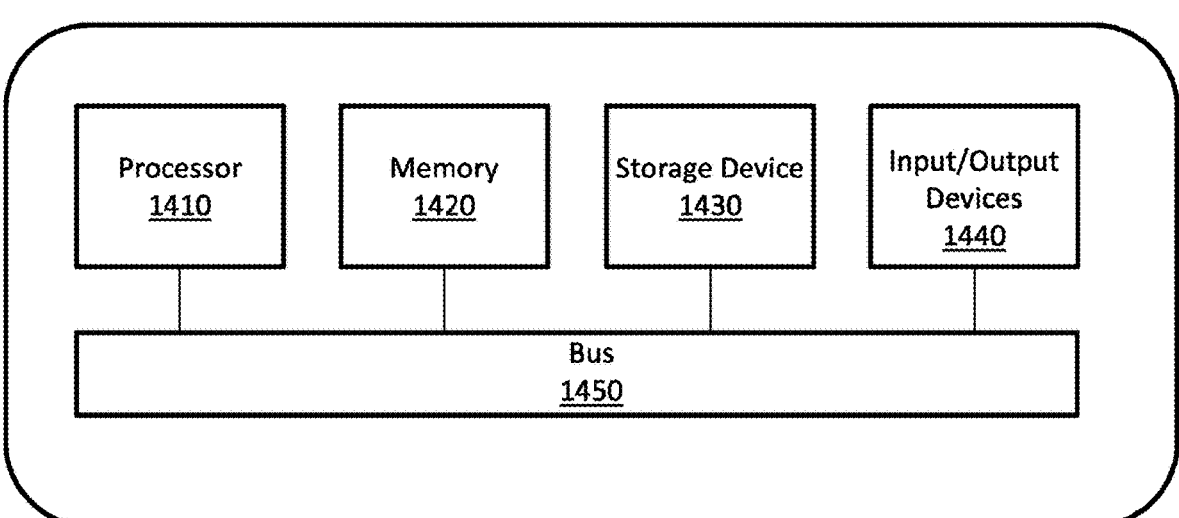
FIG. 14

OBLIVIOUS BINARY NEURAL NETWORKS

CROSS-REFERENCE TO RELATED APPLICATION

This application is a national phase entry of Patent Cooperation Treaty Application No. PCT/US2020/014211 filed Jan. 17, 2020, entitled "Oblivious Binary Neural Networks," which claims priority to U.S. Provisional Patent Application No. 62/794,474 filed Jan. 18, 2019 and entitled "Oblivious Binary Neural Networks," the disclosures of both of which are incorporated herein by reference in their entirety.

TECHNICAL FIELD

The subject matter described herein relates generally to machine learning and more specifically to an oblivious binary neural network.

BACKGROUND

The advent of big data and striking recent progress in artificial intelligence are fueling the impending industrial automation revolution. In particular, deep learning (DL), a method based on learning deep neural networks, is demonstrating a breakthrough in accuracy, outperforming human cognition in a number of critical tasks such as speech and visual recognition, natural language processing, and medical data analytics. Given its superior performance, several technology companies are now developing or already providing DL as a service: they train their DL models on a large amount of often proprietary data on their own servers; an inference API is then provided to the users who can send their data to the server and get the analysis results on their queries. The limitation of this largely popular remote inference service is that the inputs are revealed to the cloud server, breaching the privacy of sensitive user data.

SUMMARY

Systems, methods, and articles of manufacture, including computer program products, are provided for an oblivious binary neural network.

In one aspect, a framework for privacy preserving deep learning with a constant round complexity that does not need expensive matrix multiplications is provided. The framework may be scalably adapted to ensure security against malicious adversaries.

In another aspect, a conditional addition protocol based on the oblivious transfer (OT) protocol is provided to simplify costly computations for the network's (non-binary) input layer.

In another aspect, a high-level application programming interface (API) is provided to readily automate fast adaptation of the framework such that users only input a high-level description of the neural network. The API may be able to automatically train multiple networks with various accuracy to provide users with a trade-off between accuracy and performance. To further facilitate the usage of the framework, a compiler that translates the network description to the format of the framework is provided.

According to aspects disclosed herein, a method, system, computer-readable medium, and apparatus are provided to modify parameters of a neural network architecture such that the modified neural network architecture implements an oblivious inference protocol. The modification of the parameters may include transforming the parameters such that input data is not discernible to a server executing the modified neural network architecture.

In some variations, one or more of the features disclosed herein including the following features can optionally be included in any feasible combination. The modification of the parameters may include binarizing the neural network architecture to create a binary neural network architecture having weights and activations of a binary value, the binary neural network architecture having layers including channels and neurons; adjusting the binary neural network architecture by applying a factor variable to the channels and to the neurons of the layers of the binary neural network architecture; and removing redundant channels and neurons from each layer of the binary neural network architecture. Removing redundant channels and neurons from each layer of the binary neural network architecture may include ranking the channels and neurons based on a magnitude of gradient values of each of the channels and neurons; and removing, from each layer of the binary neural network architecture, the channels and neurons having a lowest magnitude of the ranked channels and/or neurons. Removing the channels and neurons having the lowest magnitude may be repeated until an accuracy falls below a predefined threshold value. Removing redundant channels and neurons from each layer of the binary neural network architecture may include applying, in response to removing the channels and neurons having the lowest magnitude, training data to the binary neural network architecture. A first layer of the binary neural network architecture may be executed by executing a vector dot product with the input data and a vector including binary values based on oblivious transfer. The vector dot product may be computed as a function of a bit-extended vector and a random vector, where the bit-extended vector may be created by bit-extending the input data, and where the random vector includes the vector having binary values. The computation of the vector dot product may be based on a message provided by a sender, where the message includes one of a first message or a second message created by the sender as a function of the bit-extended vector and the random vector. A Boolean circuit representation of each layer of the binary neural network architecture may be created, where each Boolean circuit representation is created separately, and where each layer includes a plurality of micro-circuits forming the Boolean circuit representation. Each Boolean circuit representation may include a plurality of exclusive NOR gates. A binary activation function and/or a batch normalization layer of the binary neural network architecture may be defined by a comparison circuit. The input data may be applied to a Boolean circuit representation of the binary neural network architecture to generate an output, where applying the input data to the Boolean circuit representation may include implementing a security protocol to generate an output. The security protocol may be Garbled Circuits protocol. Implementing the security protocol to generate the output may include a randomizing operation and a decrypting operation for each layer, where the randomizing operation and the decrypting operation are performed in succession such that after one layer is randomized, the one layer is successively decrypted. The randomizing operation may include creating a randomized table for each gate in the Boolean circuit representation for each layer of the binary neural network architecture, where random output labels are encrypted using input labels according to a truth table of the gate. The input labels may include weight parameters of the binary neural network architecture. An execution environment configured to implement the security protocol may interface between a client and the server. A number of interactions between the client and server may be fixed irrespective of a number of layers of the binary neural network architecture.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a binary neural network, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 6 depicts features of an oblivious conditional addition protocol consistent with implementations of the current subject matter;

4

Figure 7:
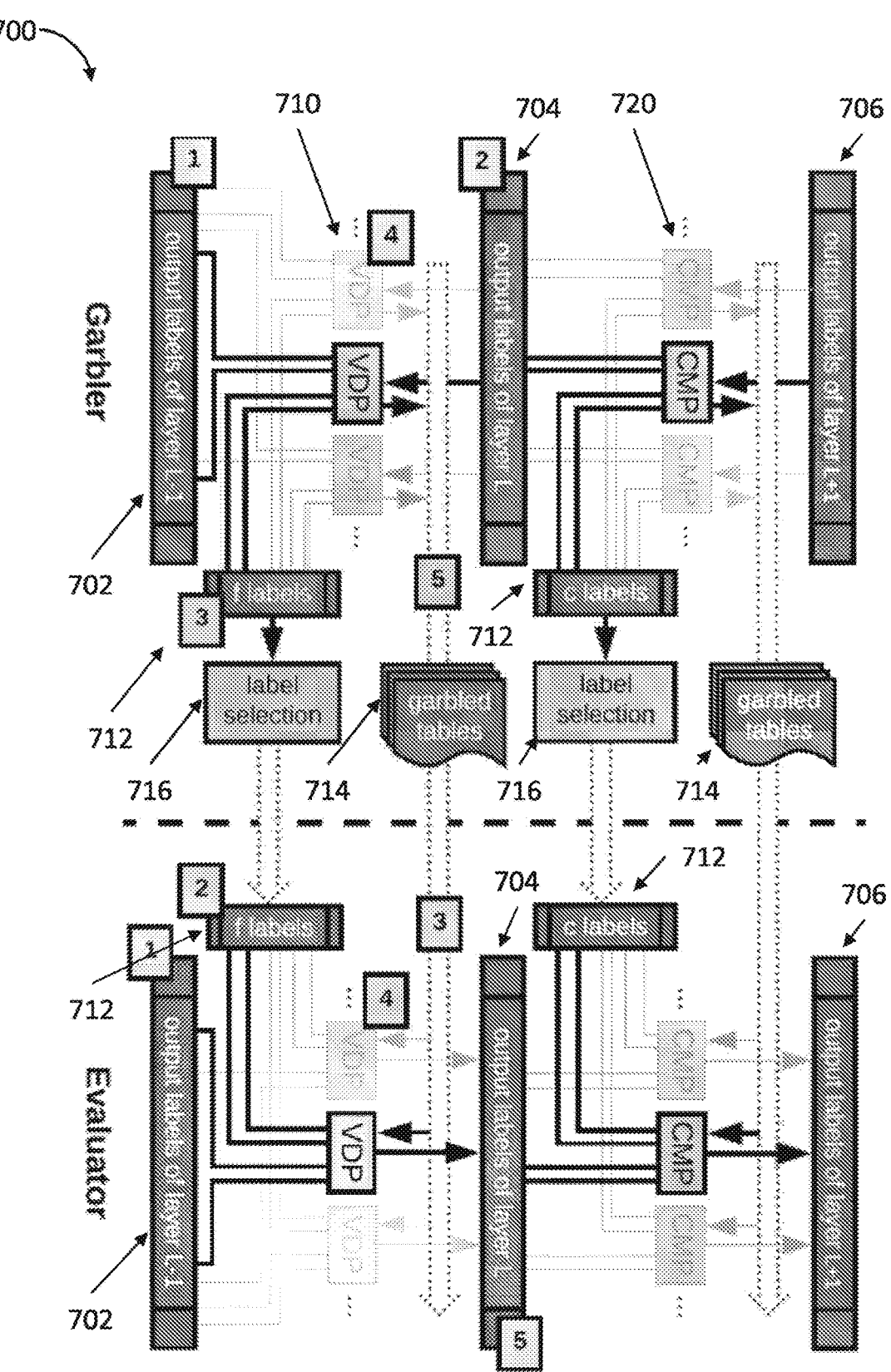
Figure 12:
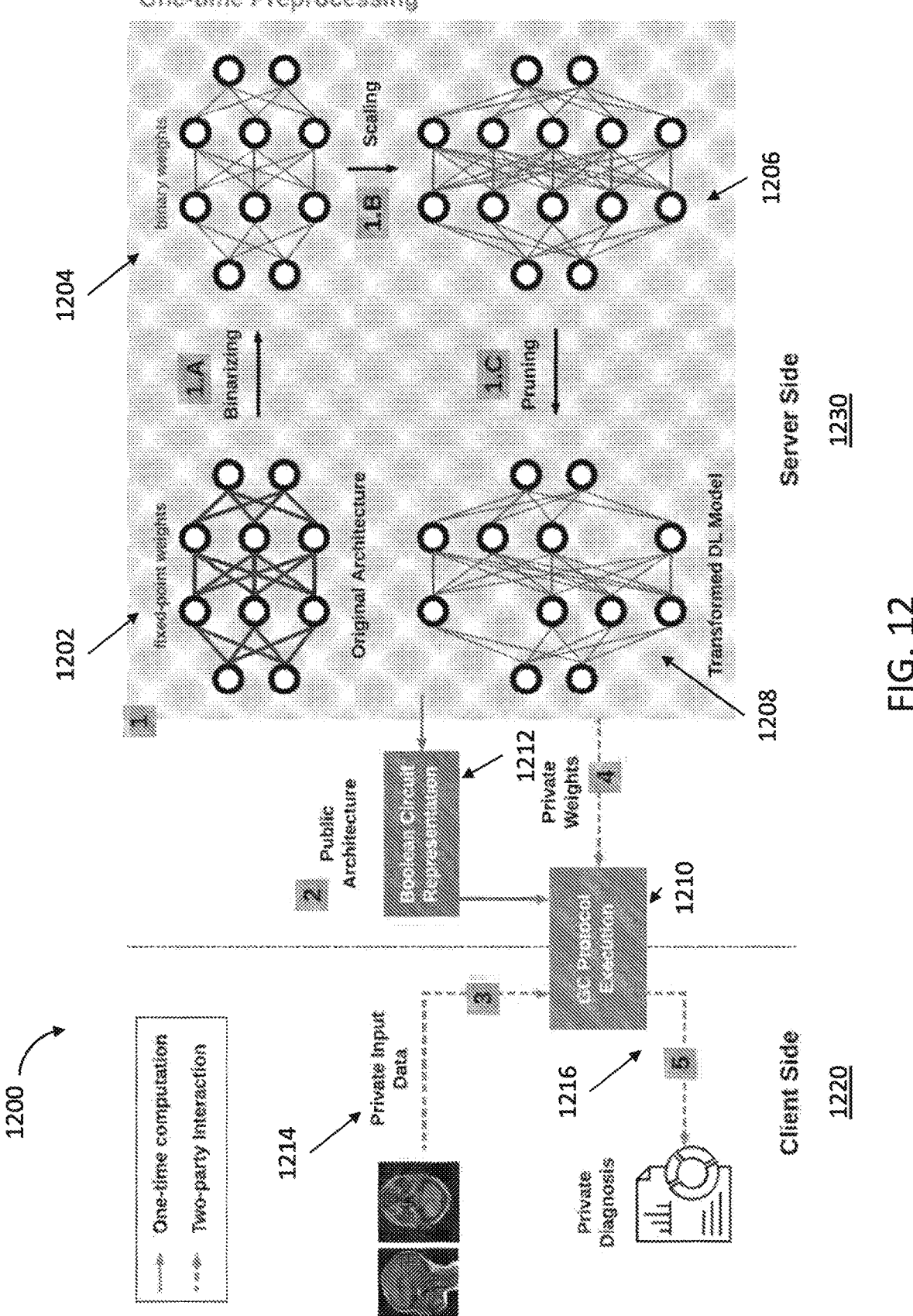

FIG. 7 is a diagram illustrating features of a modular and pipelined garbling engine consistent with implementations of the current subject matter;

FIG. 8 depicts features of sample code for the framework consistent with implementations of the current subject matter;

FIG. 9A, FIG. 9B, FIG. 10A, FIG. 10B, FIG. 11A, and FIG. 11B illustrate examples of experimental results consistent with implementations of the current subject matter;

FIG. 12 depicts aspects of a framework consistent with implementations of the current subject matter;

FIG. 13 depicts a flowchart illustrating a process consistent with implementations of the current subject matter; and FIG. 14 depicts a block diagram illustrating a computing system consistent with implementations of the current subject matter.

Like labels are used to refer to same or similar items in the drawings.

DETAILED DESCRIPTION

Aspects of the current subject matter relate to a framework which provides a conceptual and practical realization of privacy-preserving interference on deep neural networks.

Consider a deep learning (DL) model used in a medical task where a health service provider holds the prediction model. Patients submit their plaintext medical information and/or test data to the server, which uses the sensitive data to provide a medical diagnosis based on inference on its proprietary model. A naive solution to ensure privacy is to allow the patients to receive the DL model and run it on their own trusted platform. However, this solution is not practicable in real-world scenarios because: (i) The service providers commonly invest a significant amount of resources and funding to gather the massive datasets and train the DL models, which is considered an essential component of their intellectual property (IP), ensuring their profitability and competitive advantage; (ii) The DL model is known to reveal significant information about the underlying data used for training. In case of medical data, this means revealing the sensitive information of other patients which violates HIPAA and other similar patient health privacy regulations.

Oblivious inference is the task of running the DL model on the client's input without disclosing the input or the result to the server itself. Several solutions for oblivious inference have been proposed that utilize one or more cryptographic tools, such as Homomorphic Encryption (HE), Garbled Circuits (GC), Goldreich-Micali-Wigderson (GMW) protocol, and Secret Sharing (SS). Each of these cryptographic tools offer their own characteristics and tradeoffs. For example, one major drawback of HE is its computational complexity. HE has two main variants: Fully Homomorphic Encryption (FHE) and Partially Homomorphic Encryption (PHE). FHE allows computation on encrypted data but is computationally very expensive. PHE has less overhead but only supports a subset of functions or depth-bounded arithmetic circuits. The computational complexity drastically increases with the circuit's depth. Moreover, nonlinear functionalities such as the ReLU activation function in DL cannot be supported.

GC can support an arbitrary functionality while requiring only a constant round of interactions regardless of the depth of the computation. However, it has a high communication cost and a significant overhead for multiplication. More precisely, performing multiplication in GC has quadratic computation and communication complexity with respect to the bit-length of the input operands. The complexity of the contemporary DL methodologies is dominated by matrix-vector multiplications. GMW needs less communication than GC but requires many rounds of interactions between the two parties.

A standalone SS-based scheme provides a computationally inexpensive multiplication yet requires three or more independent (non-colluding) computing servers, which is a strong assumption. Mixed-protocol solutions have been proposed with the aim of utilizing the best characteristics of each of these protocols. They require secure conversion of secrets from one protocol to another in the middle of execution. Nevertheless, it has been shown that the cost of secret conversion is paid off in these hybrid solutions. The number of interactions between server and client (e.g., round complexity) in existing hybrid solutions is generally linear with respect to the depth of the DL model. Since depth is a major contributor to the deep learning accuracy, scalability of the mixed-protocol solutions with respect to the number of layers remains an unsolved issue for more complex, many-layer networks.

Aspects of the current subject matter are directed to a novel end-to-end framework which provides a paradigm shift in the conceptual and practical realization of privacy-preserving interference on deep neural networks. The existing work has largely focused on the development of customized security protocols while using conventional fixed-point deep learning algorithms. The framework consistent with implementations of the current subject matter leverages the concept of the binary neural networks (BNNs) in conjunction with the GC protocol. In BNNs, the weights and activations are restricted to binary (e.g., ±1) values, substituting the costly multiplications with simple exclusive NOR (XNOR) operations during the inference phase. The XNOR operation is known to be free in the GC protocol; therefore, performing oblivious inference on BNNs using GC results in the removal of costly multiplications. The approach consistent with implementations of the current subject matter provides for oblivious inference on the standard DL benchmarks being performed with minimal, if any, decrease in the prediction accuracy.

According to aspects of the current subject matter, an effective solution for oblivious inference takes into account the deep learning algorithms and optimization methods that can tailor the DL model for the security protocol. Current DL models are designed to run on CPU/GPU platforms where many multiplications can be performed with high throughput, whereas bit-level operations are very inefficient. In the GC protocol, however, bit-level operations are inexpensive, but multiplications are rather costly. As such, consistent with implementations of the current subject matter deep neural networks are trained in which many bit-level operations are involved but no multiplications in the inference phase are involved. By using the idea of learning binary networks, consistent with implementations of the current subject matter, an average of 21 times reduction in the number of gates for the GC protocol may be achieved.

Moreover, the framework consistent with implementations of the current subject matter renders a constant round of interactions between the client and the server, which has a significant effect on the performance on oblivious inference in Internet settings.

In the following description related to aspects of the current subject matter, scalars are represented as lowercase letters ($x \in \mathbb{R}$), vectors are represented as bold lowercase letters ($x \in \mathbb{R}^n$), matrices are denoted as capital letters ($x \in \mathbb{R}^{m \times n}$), and tensors of more than two ways are shown using bold capital letters ($X \in \mathbb{R}^{m \times n}$). Brackets denote element selection and the colon symbol stands for all elements—W [i,:] represents all values in the i-th row of W.

Deep-Neural Networks: The computational flow of a deep neural network is composed of multiple computational layers. The input to each layer is either a vector (e.g., $x \in \mathbb{R}^n$) or a tensor (e.g., $X \in \mathbb{R}^{m \times n \times k}$). The output of each layer serves as the input of the next layer. The input of the first layer is the raw data and the output of the last layer represents the network's prediction on the given data, the inference result. In an image classification task, for example, the raw image serves as the input to the first layer and the output of the last layer is a vector whose elements represent the probability that the image belongs to each category.

Linear operations in neural networks are performed in fully-connected (FC) and convolution (CONV) layers. The vector dot product (VDP) between two vectors $x \in \mathbb{R}^n$ and $w \in \mathbb{R}^n$ is defined as follows in equation 1:

$$VDP(x, w) = \sum_{i=1}^{n} w[i] \cdot x[i]. \tag{1}$$

Both CONV and FC layers repeat VDP computation to generate outputs. A fully connected layer takes a vector $x \in \mathbb{R}^n$ and generates the output $y \in \mathbb{R}^m$ using a linear transformation as in equation 2:

$$y = W \cdot x + b, \tag{2}$$

where $W \in \mathbb{R}^{m \times n}$ is the weight matrix and $b \in \mathbb{R}^m$ is a bias vector. More precisely, the i-th output element is computed as $y[i] = VDP(W[i,:], x) + b[i]$.

A convolution layer is another form of linear transformation that operates on images. The input of a CONV layer is represented as multiple rectangular channels (2D images) of the same size: $x \in \mathbb{R}^{h1 \times h2 \times c}$, where h1 and h2 are the dimensions of the image and c is the number of channels. The CONV layer maps the input image into an output image $Y \in \mathbb{R}^{h1' \times h2' \times f}$. A CONV layer has a weight tensor $W \in \mathbb{R}^{k \times k \times c \times f}$ and a bias vector $b \in \mathbb{R}^f$. The i-th output channel in a CONV layer is computed by sliding the kernel $W[:,:,:,i] \in \mathbb{R}^{k \times k \times c}$ over the input, computing the dot product between the kernel and the windowed input, and adding the bias term b[i] to the result.

The output of linear transformations (e.g., CONV and FC) is usually fed to an activation layer, which applies an elementwise nonlinear transformation to the vector/tensor and generates an output with the same dimensionality. According to aspects of the current subject matter, the binary activation (BA) function is utilized for hidden layers. The binary activation function maps the input operand to its sign value (e.g., +1 or −1).

A batch normalization (BN) layer is typically applied to the output of linear layers to normalize the results. If a BN layer is applied to the output of a CONV layer, it multiplies all of the i-th channel's elements by a scalar $\gamma[i]$ and adds a bias term $\beta[i]$ to the resulting channel. If BN is applied to the output of an FC layer, it multiplies the i-th element of the vector by a scalar $\gamma[i]$ and adds a bias term $\beta[i]$ to the result.

Pooling layers operate on image channels outputted by the CONV layers. A pooling layer slides a window on the image channels and aggregates the elements within the window into a single output element. Max-pooling and average-pooling are two common pooling operations in neural networks. Typically, pooling layers reduce the image size but do not affect the number of channels.

Secret Sharing: A secret can be securely shared among two or multiple parties using Secret Sharing (SS) schemes. An SS scheme guarantees that each share does not reveal any information about the secret. The secret can be reconstructed using all (or subset) of shares. Consistent with implementations of the current subject matter, additive secret sharing is used, in which a secret S is shared among two parties by sampling a random number $\hat{S}_1 \in_R \mathbb{Z}_{2^b}$ (integers modulo $2^b$) as the first share and creating the second share as $\hat{S}_2 = s - \hat{S}_1 \bmod 2^b$, where b is the number of bits to describe the secret. While none of the shares reveal any information about the secret S, they can be used to reconstruct the secret as $s = \hat{S}_1 + \hat{S}_2 \bmod 2^b$. Suppose that two secrets $S^{(1)}$ and $S^{(2)}$ are shared among two parties where party-1 has $$\hat{S}_1^{(1)} \text{ and } \hat{S}_1^{(2)}$$

and party-2 has $$\hat{S}_2^{(1)} \text{ and } \hat{S}_2^{(2)}$$

Party-1 can create a share of the sum of two secrets as $$\hat{S}_1^{(1)} + \hat{S}_1^{(2)} \bmod 2^b$$

without communicating to the other party. This can be generalized for arbitrary (e.g., more than two) number of secrets as well. Additive secret sharing may be used, consistent with implementations of the current subject matter, in an Oblivious Conditional Addition (OCA) protocol.

Oblivious Transfer: One of the most crucial building blocks of secure computation protocols, e.g., GC, is the Oblivious Transfer (OT) protocol. In OT, two parties are involved: a sender and a receiver. The sender holds n different messages $m_j$, j=1 . . . n, with a specific bit-length and the receiver holds an index (ind) of a message that she wants to receive. At the end of the protocol, the receiver gets $m_{ind}$, with no additional knowledge about the other messages and the sender learns nothing about the selection index. In GC, 1-out-of-2 OT is used where n=2 in which case the selection index is only one bit. The initial realizations of OT required costly public key encryptions for each run of the protocol. However, the OT Extension technique enables performing OT using more efficient symmetric-key encryption in conjunction with a fixed number of base OTs that need public-key encryption. OT is used both in the OCA protocol as well as the Garbled Circuits protocol.

Garbled Circuits: Yao's Garbled Circuits (GC) is one of the generic two-party secure computation protocols. In GC, the result of an arbitrary function $f(.)$ on inputs from two parties can be computed without revealing each party's input to the other. Before executing the protocol, function $f(.)$ has to be described as a Boolean circuit with two-input gates.

GC has three main phases: garbling, transferring data, and evaluation. In the first phase, only one party, the Garbler, is involved. The Garbler starts by assigning two randomly generated 1-bit binary strings to each wire in the circuit. These binary strings are called labels and they represent semantic values 0 and 1. The label of wire w corresponding to the semantic value x is denoted as $$L_x^w.$$

For each gate in the circuit, the Garbler creates a four-row garbled table as follows. Each label of the output wire is encrypted using the input labels according to the truth table of the gate. For example, consider an AND gate with input wires a and b and output wire c. The last row of the garbled table is the encryption of $$L_1^c$$

using labels $$L_1^a \text{ and } L_1^b.$$

Once the garbling process is finished, the Garbler sends all of the garbled tables to the evaluator. Moreover, he sends the correct labels that correspond to input wires that represent his inputs to the circuit. For example, if wire w* is the first input bit of the Garbler and his input is 0, he sends $$L_0^*.$$

The evaluator acquires the labels corresponding to her input through 1-out-of-2 OT where Garbler is the sender with two labels as his messages and the evaluator's selection bit is her input for that wire. Having all of the garbled tables and labels of input wires, the evaluator can start decrypting the garbled tables one by one until reaching the final output bits. She then learns the plaintext result at the end of the GC protocol based on the output labels and their relationships to the semantic values that are received from the Garbler.

Consistent with implementations of the current subject matter, neural networks are trained such that they incur the minimum cost during the oblivious inference. The most computationally intensive operation in a neural network is matrix multiplication. In GC, each multiplication has a quadratic computation and communication cost with respect to the input bit-length. This is the major source of inefficiency in prior work. Implementations of the current subject matter overcome this limitation by changing the learning process such that the trained neural network's weights become binary. As a result, costly multiplication operations are replaced with XNOR gates which are essentially free in GC.

Customized Network Binarization: Numerical optimization algorithms minimize a specific cost function associated with neural networks. It is well-known that neural network training is a nonconvex optimization, meaning that there exist many locally-optimum parameter configurations that result in similar inference accuracies. Among these parameter settings, there exist solutions where both neural network parameters and activation units are restricted to take binary values (e.g., either +1 or −1); these solutions are known as Binary Neural Networks (BNNs). In other words, a BNN is a neural network restricted to operating using binary values.

One major shortcoming of BNNs is their (often) low inference accuracy. In the machine learning community, several methods have been proposed to modify BNN functionality for accuracy enhancement. These methods are devised for plaintext execution of BNNs and are not efficient for oblivious inference with GC.

Consistent with implementations of the current subject matter, when modifying BNNs for accuracy enhancement, implications in the corresponding GC circuit are also taken into account. Thus, according to aspects of the current subject matter, the number of channels and neurons in CONV and FC layers, respectively, are modified. Increasing the number of channels/neurons leads to a higher accuracy but it also increases the complexity of the corresponding GC circuit. As a result, the framework consistent with implementations of the current subject matter may provide a tradeoff between the accuracy and the communication/runtime of the oblivious inference. This tradeoff enables cloud servers to customize the complexity of the GC protocol to optimally match the computation and communication requirements of the clients. To customize the BNN, the framework consistent with implementations of the current subject matter configures the per-layer number of neurons in two steps. First is a linear scaling step, in which, prior to training, the number of channels/neurons in all BNN layers are scaled with the same factor (s) (e.g., s=2). Then the scaled BNN architecture is trained. The second step to configure the per-layer number of neurons involves network from each hidden layer to reduce the GC cost while maintaining the inference accuracy.

Figure 1:
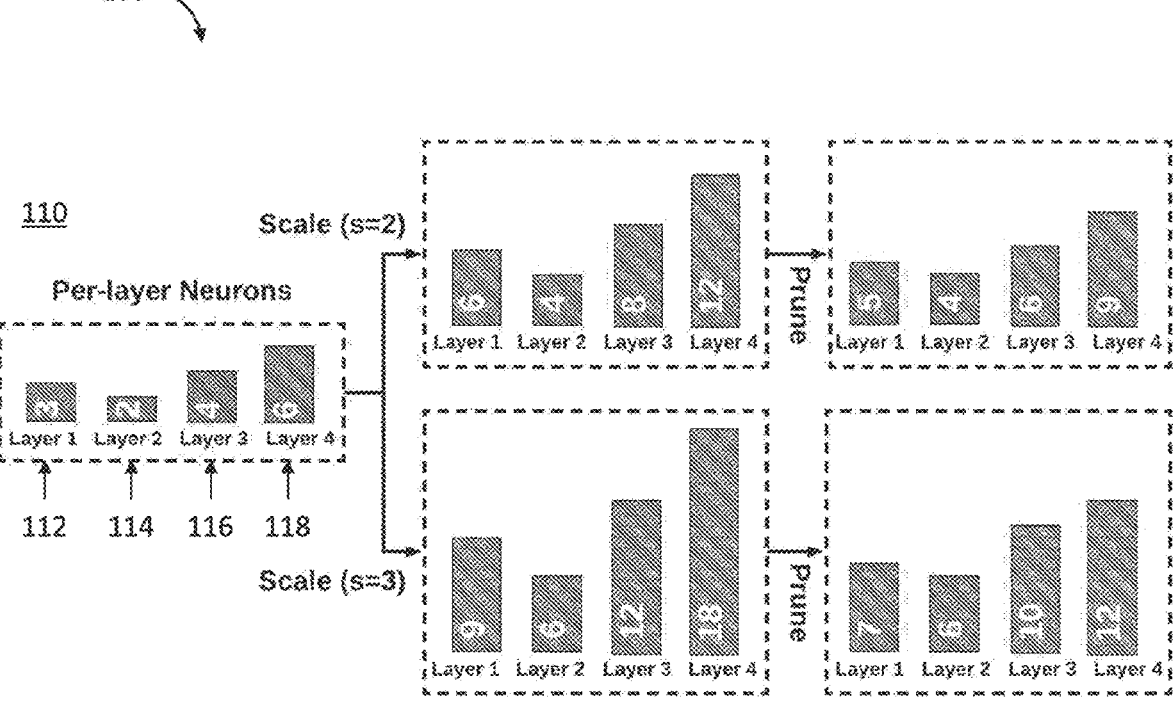
FIG. 1 illustrates a binary neural network customization method consistent with implementations of the current subject matter.

FIG. 1 illustrates a BNN customization method 100 for an example baseline network 110 with four hidden layers 112, 114, 116, 118 consistent with implementations of the current subject matter. The bars in FIG. 1 represent the number of neurons in each hidden layer. According to aspects of the current subject matter, network trimming (e.g., pruning) includes two steps: feature ranking (which may include scaling operations) and iterative pruning.

Feature Ranking: In order to perform network trimming, the channels/neurons of each layer are sorted based on their contribution to the inference accuracy. In conventional neural networks, simple ranking methods sort features based on absolute value of the neurons/channels. In BNNs, however, the weights/features are either +1 or −1 and the absolute value is not informative. To overcome this issue, consistent with implementations of the current subject matter, an approximation, such as a first order Taylor approximation, of neural networks is utilized, and the features are sorted based on the magnitude of the gradient values. The gradient with respect to a certain feature determines its importance; a high (absolute) gradient indicates that removing the neuron has a destructive effect on the inference accuracy. A feature ranking method according to aspects of the current subject matter is described in Algorithm 1 at Table 1 below.

TABLE 1

Algorithm 1 $X_{ONN}$ Channel Sorting for CONV Layers

| | |
|---|---|
| Inputs: | Trained BNN with loss function $\mathcal{L}$, CONV layer l with output shape of h1 × h2 × f, subsampled validation data and labels $\{(X_1, z_1), \ldots, (X_k, z_k)\}$ |
| Output: | Indices of the sorted channels: $\{i_0, \ldots, i_f\}$ |
| 1: | G < zeros(k × h1 × h2 × f)     ▷ define gradient tensor |
| 2: | for i = 1, . . . , k do |
| 3: | $\mathcal{L} = (X_i, z_i)$     ▷ evaluate loss function |
| 4: | $\nabla_Y = \dfrac{\partial \mathcal{L}}{\partial Y}$     ▷ compute gradient w.r.t. layer output |
| 5: | G[i, :, :, :] ← $\nabla_Y$     ▷ store gradient |
| 6: | end for |
| 7: | $G_{abs}$ ← |G|     ▷ take elementwise absolute values |
| 8: | $g_s$ ← zeros(f)     ▷ define sum of absolute values |
| 9: | for i = 1, . . . , f do |
| 10: | $g_s[i]$ ← sum($G_{abs}$[:, :, :, i]) |
| 11: | end for |
| 12: | $\{i_0, \ldots, i_f\}$ ← sort($g_s$) |
| 13: | return $\{i_0, \ldots, i_f\}$ | trimming. According to aspects of the current subject matter, once the uniformly scaled network is trained, a post-processing algorithm removes redundant channels/neurons Iterative Pruning: A step-by-step algorithm for model pruning according to aspects of the current subject matter is summarized in Algorithm 2 at Table 2 below.

TABLE 2

Algorithm 2 $X_{ONN}$ Iterative BNN Pruning

| | | |
|---|---|---|
| Inputs: | Trained BNN with n overall CONV and FC layers, minimum accuracy threshold θ, number of pruning trials per layer t, subsampled validation data and labels data$_V$, training data and labels data$_T$ | |
| Output: | BNN with pruned layers | |
| 1: | p < zeros(n 1) | ▷ current number of pruned neurons/channels per layer |
| 2: | $a_{curr}$ ← Accuracy(BNN ,data$_V$ |p) | ▷ current BNN validation accuracy |
| 3: | $c_{curr}$ ← Cost (BNN |p)) | ▷ current GC cost |
| 4: | while $a_{curr}$ > θ do | ▷ repeat until accuracy drops below 0 |
| 5: | for l − 1, . . . , n − 1 do | ▷ search over all layers |
| 6: | inds ← Rank(BNN, l, data$_V$) | ▷ rank features via Algorithm 1 |
| 7: | f ← Number of neurons/channels | ▷ number of output neurons/channels |

TABLE 2-continued

Algorithm 2 $X_{ONN}$ Iterative BNN Pruning

| 8: | for $p = p[l], p[l] + \dfrac{f}{t}, \ldots, f$ do | ▷ search over possible pruning rates |
|---|---|---|
| 9: | $BNN_{next} \leftarrow$ Prune(BNN, l, p, inds) | ▷ prune p features with lowest ranks from the l-th layer |
| 10: | $a_{next} \leftarrow$ Accuracy($BNN_{next}$, $data_{V}$\|p[l], . . . , p[l] = p, . . . , p[n − 1]) | ▷ validation accuracy if pruned |
| 11: | $c_{next} \leftarrow$ Cost ($BNN_{next}$ p[l], . . . , p[l] = p[n − 1]) | ▷ GC cost if pruned |
| 12: | reward $(l, p) = \dfrac{c_{curr} - c_{next}}{e^{(a_{curr} - a_{next})}}$ | ▷ compute reward given that p features are pruned from layer l |
| 13: | end for | |
| 14: | end for | |
| 15: | $\{l^*, p^*\} \leftarrow$ argmax$_{l,p}$ reward(l, p) | ▷ select layer l* and pruning rate p* that maximize the reward |
| 16: | p[l*] $\leftarrow$ p* | ▷ update the number of pruned features in vector p |
| 17: | BNN $\leftarrow$ Prune(BNN, l*, p*, inds) | ▷ prune p* features with lowest ranks from the l*-th layer |
| 18: | BNN $\leftarrow$ Fine-tune(BNN, $data_T$) | ▷ fine-tune the pruned model using training data to recover accuracy |
| 19: | $a_{curr} \leftarrow$ Accuracy(BNN, $data_{V}$\|p) | ▷ update current BNN validation accuracy |
| 20: | $c_{curr} \leftarrow$ Cost (BNN\|p) | ▷ update current GC cost |
| 21: | end while | |
| 22: | return BNN | |

At each step, the algorithm (at Table 2) selects one of the BNN layers l* and removes the first p* features with the lowest importance (line 17). The selected layer l* and the number of pruned neurons p* maximize the following reward (line 15) as represented by equation 3:

$$\text{reward}(l, p) = \frac{c_{curr} - c_{next}}{e^{a_{curr}\ a_{next}}}, \quad (3)$$

where $c_{curr}$ and $c_{next}$ are the GC complexity of the BNN before and after pruning, where $a_{curr}$ and $a_{next}$ denote the corresponding validation accuracies. The numerator of this reward encourages higher reduction in the GC cost while the denominator penalizes accuracy loss. Once the layer is pruned, the BNN is fine-tuned to recover the accuracy (line 18). The pruning process stops once the accuracy drops below a predefined threshold.

Oblivious Inference: BNNs are trained such that the weights and activations are binarized (e.g., they can only have two possible values: +1 or −1). This property allows BNN layers to be rendered using a simplified arithmetic.

Binary Linear Layer: Most of the computational complexity of neural networks is due to the linear operations in CONV and FC layers. Linear operations are realized using vector dot product (VDP). In BNNs, VDP operations can be implemented using simplified circuits. The VDP operations consistent with implementations of the current subject matter may be categorized into two classes: (i) integer-VDP where only one of the vectors is binarized and the other has integer elements and (ii) binary-VDP where both vectors have binary (±1) values.

Integer-VDP: For the first layer of the neural network, the server has no control over the input data which is not necessarily binarized. The server can only train binary weights and use them for oblivious inference. Consider an input vector $x \in \mathbb{R}^n$ with integer (possibly fixed-point) elements and a weight vector $w \in \{1,1\}^n$ with binary values. Since the elements of the binary vector can only take +1 or −1, the integer-VDP can be rendered using additions and subtractions. In particular, the binary weights can be used in a selection circuit that decides whether the pertinent integer input should be added to or subtracted from the VDP result.

Figure 2:
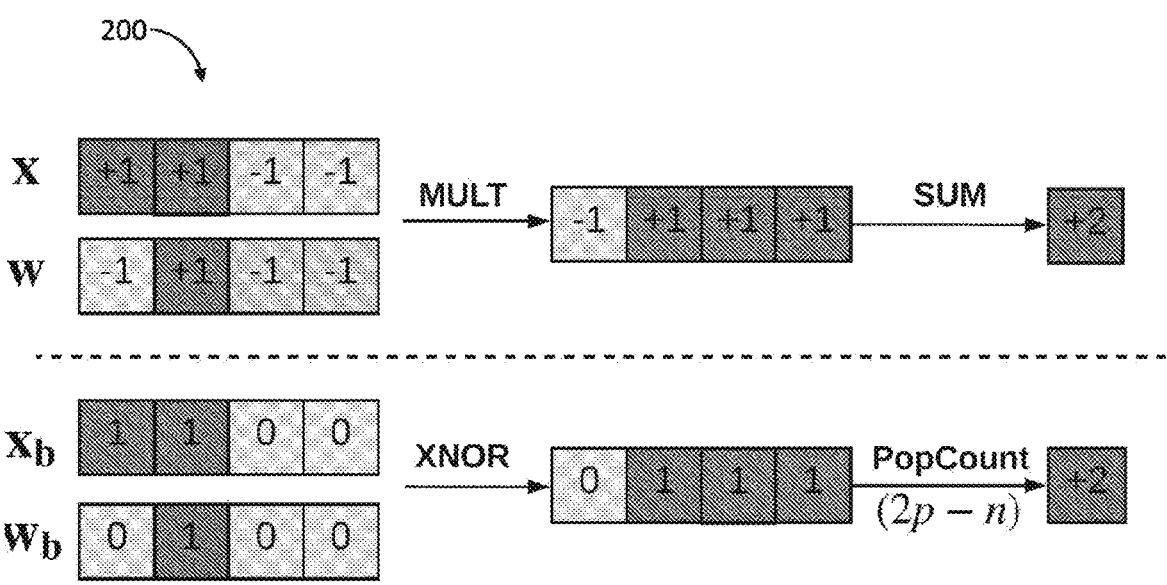
FIG. 2 illustrates features of vector dot product and exclusive NOR operations consistent with implementations of the current subject matter.

Binary-VDP: Consider a dot product between two binary vectors $x \in \{-1,+1\}^n$ and $w \in \{-1,+1\}^n$. If each element is encoded with one bit (e.g., −1→0 and +1→0), binary vectors $x_b \in \{0,1\}^n$ and $w_b \in \{0, 1\}^n$ are obtained. The dot product of x and w may be efficiently computed using an XnorPopcount operation. FIG. 2 is a diagram 200 depicting the equivalence of VDP (x, w) and XnorPopcount ($x_b$,$w_b$) for a VDP between 4-dimensional vectors. First, elementwise XNOR operations are performed between the two binary encodings. Next, the number of set bits p is counted, and the output is computed as 2p−n.

Binary Activation Function: A binary activation (BA) function takes input x and maps it to y=Sign(x) where Sign(.) outputs either +1 or −1 based on the sign of its input. This functionality can simply be implemented by extracting the most significant bit of x.

Binary Batch Normalization: In BNNs, it is often useful to normalize feature x using a batch normalization (BN) layer before applying the binary activation function. More specifically, a BN layer followed by a BA is equivalent to:

$$y = \text{Sign}(\gamma \cdot x + \beta) = \text{Sign}\left(x + \frac{\beta}{\gamma}\right),$$

since γ is a positive value. The combination of the two layers (BN+BA) may be realized by a comparison between x and $$-\frac{\beta}{\gamma}.$$

Figure 3:
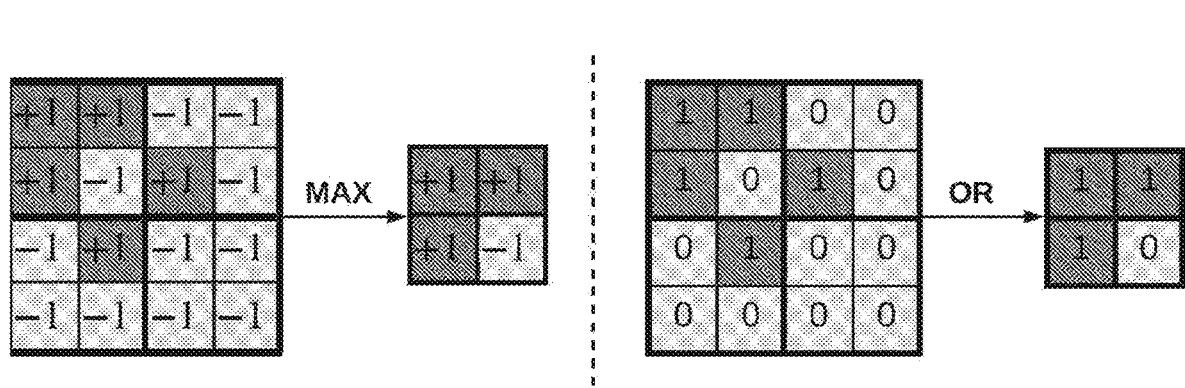
FIG. 3 illustrates features of operations in binary neural networks consistent with implementations of the current subject matter.
Figure 4:
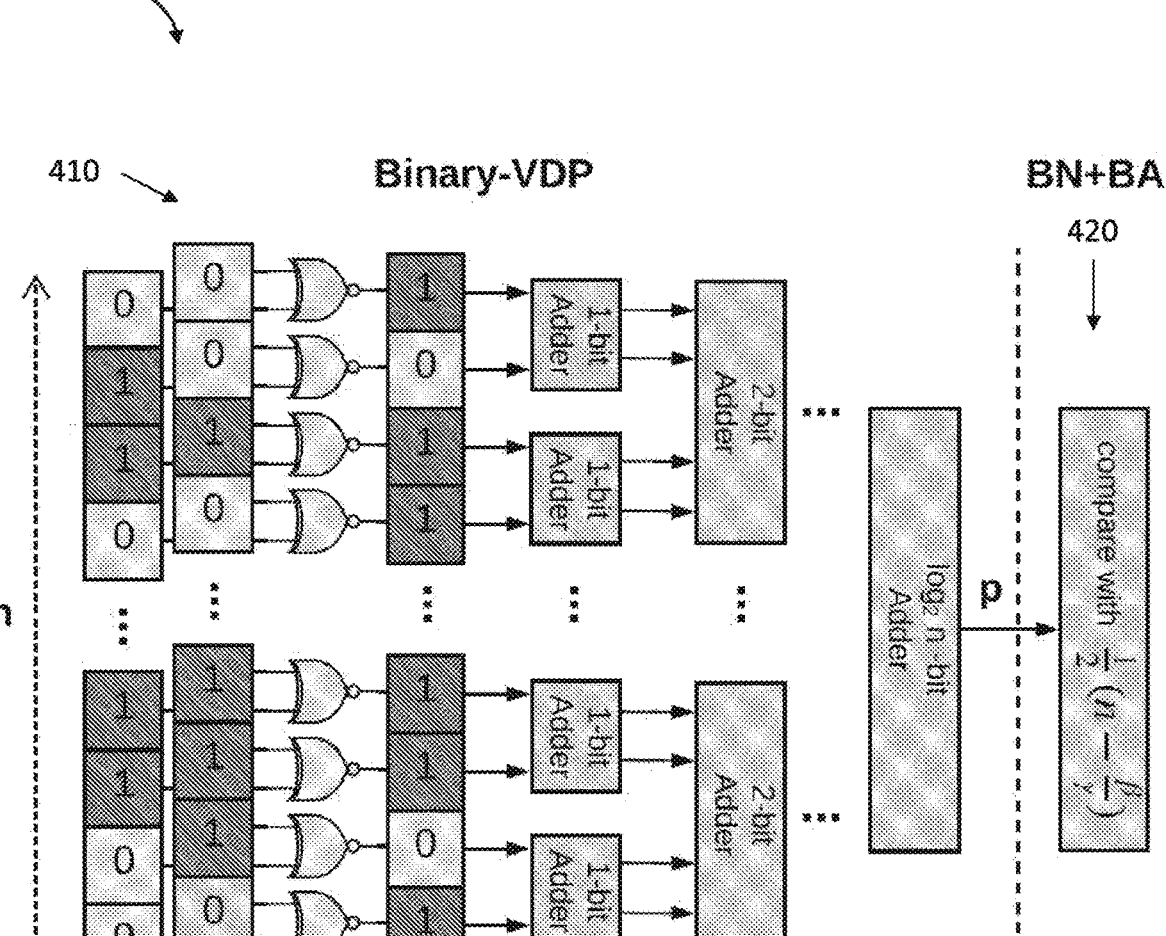
FIG. 4 depicts features of a Boolean circuit for binary vector dot product consistent with implementations of the current subject matter.
Figure 5:
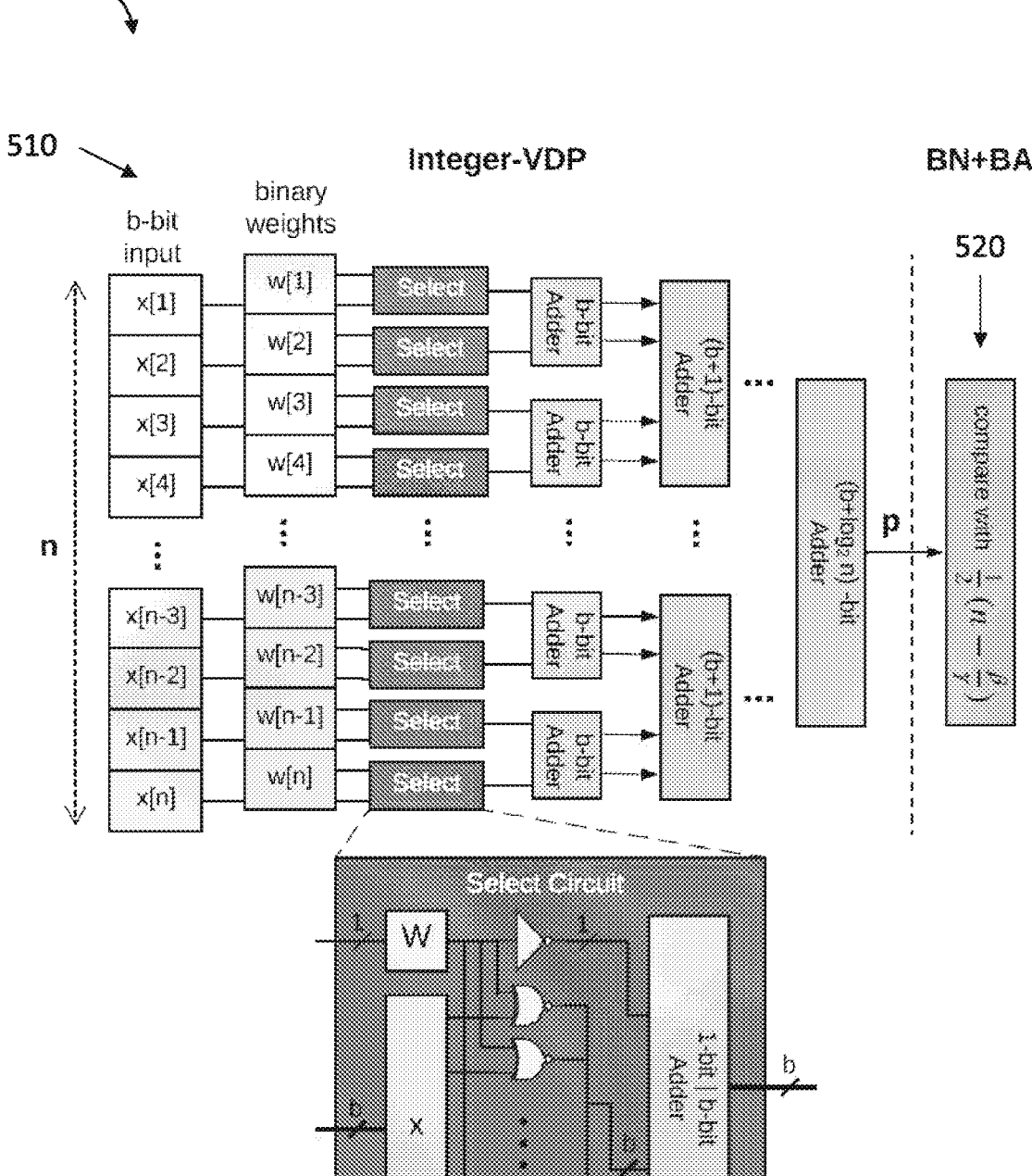
FIG. 5 depicts features of a Boolean circuit for integer vector dot product consistent with implementations of the current subject matter.

Binary Max-Pooling: Assuming the inputs to the max-pooling layers are binarized, taking the maximum in a window is equivalent to performing logical OR operation over the binary encodings as depicted in diagram 300 of FIG. 3. Average-pooling layers are usually not used in BNNs since the average of multiple binary elements is no longer a binary value Diagram 400 of FIG. 4 demonstrates a Boolean circuit for binary-VDP 410 followed by BN and BA 420. The number of non-XOR gates for binary-VDP 410 is equal to the number of gates required to render the tree-adder structure in FIG. 4. Similarly, diagram 500 of FIG. 5 illustrates the integer-VDP counterpart. As shown in FIG. 5, in the first level of the tree-adder of integer-VDP 510, the binary weights determine whether the integer input should be added to or subtracted from the final result within the "select" circuit. The next levels of the tree-adder compute the result of the integer-VDP using "adder" blocks. The combination of BN and BA 520 is implemented using a single comparator. Compared to binary-VDP, integer-VDP has a high garbling cost which is linear with respect to the number of bits. To mitigate this problem, an alternative solution based on oblivious transfer (OT) is provided consistent with implementations of the current subject matter.

In the framework consistent with implementations of the current subject matter, all of the activation values as well as neural network weights are binary. However, the input to the neural network is provided by the user and is not necessarily binary. The first layer of a typical neural network may include either an FC or a CONV layer, both of which are evaluated using oblivious integer-VDP. On the one side, the user provides her input as non-binary (integer) values. On the other side, the network parameters are binary values representing −1 and 1. Consistent with implementations of the current subject matter, integer-VDP may be described as an oblivious transfer problem. The user's input is denoted as a vector $v_1$ of n (b-bit) integers. The server holds a vector of n binary values denoted by $v_2$. The result of Integer-VDP is a number "y" that can be described as follows:

$$b' - \lceil \log_2(n \cdot (2^b - 1)) \rceil$$

bits. Diagram 600 of FIG. 6 summarizes the steps in the OCA protocol. The first step is to bit-extend $v_1$ from b-bit to b'-bit. In other words, if $v_1$ is a vector of signed integer/fixed-point numbers, the most significant bit should be repeated (b'−b) many times, otherwise, it has to be zero-padded for most significant bits. The bit-extended vector is denoted by $$v_1^*.$$

The second step is to create the two's complement vector of $$v_1^*,$$

called $$\bar{v}_1^*.$$

The client also creates a vector of n (b'-bit) randomly generated numbers, denoted as r. The client computes elementwise vector subtractions $$v_1^* - r\mathrm{mod}2^{b'} \text{ and } \bar{v}_1^* - r\mathrm{mod}2^{b'}$$

These two vectors are n-many pair of messages that will be used as input to n-many 1-out-of-two OTs. More precisely, $$v_1^* - r\mathrm{mod}2^{b'}$$

is a list of first messages and $$\bar{v}_1^* - r\mathrm{mod}2^{b'}$$

is a list of second messages. The server's list of selection bits is $V_2$. After n-many OTs are finished, the server has a list of n transferred numbers called $v_t$ where:

$$v_t[i] = \begin{cases} \bar{v}_1^*[i] - r[i]\mathrm{mod}2^{b'} & \text{if } v_2[i] = 0 \\ v_1^*[i] - r[i]\mathrm{mod}2^{b'} & \text{if } v_2[i] = 1 \end{cases} \quad i = 1, \ldots, n.$$

Finally, the client computes $$y_1 = \sum_{i=1}^{n} v_t[i]\mathrm{mod}2^{b'}$$

and the server computes $$y_2 = \sum_{i=1}^{n} v_t[i]\mathrm{mod}2^{b'}.$$

By OT's definition, the receiver (server) gets only one of the two messages from the sender. That is, based on each selection bit (a binary weight), the receiver gets an additive share of either the sender's number or its two's complement. Upon adding all of the received numbers, the receiver computes an additive share of the integer-VDP result. Even though the sender does not know which messages were selected by the receiver, the sender can add all of the randomly generated numbers r[i]s which is equal to the other additive share of the integer-VDP result. Since all numbers are described in the two's complement format, subtractions are equivalent to the addition of the two's complement values, which are created by the sender at the beginning of OCA. Moreover, it is possible that as values are accumulated, the bit-length of the final integer-VDP result grows accordingly. This is supported due to the bit-extension process at the beginning of the protocol. In other words, all additions are performed in a larger ring such that the result does not overflow. Note that all numbers belong to the ring $\mathbb{Z}_{2^{b'}}$ and by definition, a ring is closed under addition, therefore, yi and y2 are true additive shares of $y=y_1+y_2$ mod $2^{b'}$. All linear operations in the first layer of the DL model (either FC or CONV) can be formulated as a series of integer-VDPs.

In traditional OT, public-key encryption is typically needed for each OT invocation which can be computationally expensive. However, the oblivious transfer extension technique provides for performing many OTs using symmetric-key encryption and only a fixed number of public-key operations.

Required Modification to the Next Layer: An "addition" layer is needed, according to aspects of the current subject matter, to reconstruct the true value of y from its additive shares before further processing it.

Comparison to Integer-VDP in GC: Table 3 below shows the computation and communication costs for two approaches: (i) computing the first layer in GC and (ii) utilizing OCA. OCA removes the GC cost of the first layer in the framework consistent with implementations of the current subject matter. However, it adds the overhead of a set of OTs and the GC costs associated with the new ADD layer.

TABLE 3

| Costs | | | OCA | |
|---|---|---|---|---|
| {Sender.Receiver} | GC | OT | ADD Layer | |
| Comp (AES opx) | $(n + 1) \cdot b \cdot \{2,4\}$ | $n \cdot \{1, 2\}$ | $b' \cdot \{2, 4\}$ | |
| Comm (bit) | $(n - 1) \cdot b \cdot 2 \cdot 128$ | $n \cdot b$ | $b' \cdot 2 \cdot 128$ | |

Consistent with implementations of the current subject matter, the Honest-but-Curious (HbC) adversary model consistent with the state-of-the-art solutions for oblivious inference is considered. In this model, neither of the involved parties is trusted but they are assumed to follow the protocol. Both server and client cannot infer any information about the other party's input from the entire protocol transcript. The framework consistent with implementations of the current subject matter relies on the GC and OT protocols, both of which are proven to be secure in the HbC adversary model. Utilizing binary neural networks does not affect GC and OT protocols. More precisely, the function $f(.)$ that is evaluated in GC is changed such that it is more efficient for the GC protocol: drastically reducing the number of AND gates and using XOR gates instead. The Oblivious Conditional Addition (OCA) protocol consistent with implementations of the current subject matter is also based on the OT protocol. The sender creates a list of message pairs and puts them as input to the OT protocol. Each message is an additive share of the sender's private data from which the secret data cannot be reconstructed. The receiver puts a list of selection bits as input to the OT. By OT's definition, the receiver learns nothing about the unselected messages and the sender does not learn the selection bits.

Security Against Malicious Adversaries: In a malicious security model, the adversary (either the client or server) can deviate from the protocol at any time with the goal of learning more about the input from the other party. The framework consistent with implementations of the current subject matter may be automatically adapted to the malicious security using cut-and-choose techniques. These methods take a GC protocol in HbC and readily extend it to the malicious security model. This modification increases the overhead but enables a higher security level.

Consistent with implementations of the current subject matter, a GC framework is defined based upon the following design principles: (i) Efficiency: the framework is designed to have a minimal data movement and low cache-miss rate. (ii) Scalability: oblivious inference inevitably requires significantly higher memory usage compared to plaintext evaluation of neural networks. High memory usage is one critical shortcoming of state-of-the-art secure computation frameworks. However, the framework according to aspects of the current subject matter is designed to scale for very deep neural networks that have higher accuracy compared to networks previously considered. (iii) Modularity: the framework according to aspects of the current subject matter enables users to create Boolean description of different layers separately. This allows the hardware synthesis tool to generate more optimized circuits. (iv) Ease-to-use: the framework according to aspects of the current subject matter provides a very simple API that requires few lines of neural network description. Moreover, aspects of the current subject matter provide a compiler that takes a Keras description and automatically creates the network description for the framework API.

The framework according to aspects of the current subject matter may be written in C++ and supports all major GC optimizations proposed previously although other languages and dedicated circuit implementations may be used as well. Since the introduction of GC, many optimizations have been proposed to reduce the computation and communication complexity of this protocol. Garbling may be performed using efficient fixed-key AES encryption. Implementations according to the current subject matter may benefit from such an optimization by using Intel AES-NI instructions. Row-reduction technique reduces the number of garbled tables from four to three. Half-Gates technique further reduces the number of rows in the garbled tables from three to two. One of the most influential optimizations for the GC protocol is the free-XOR technique which makes XOR, XNOR, and NOT almost free of cost. Implementations for Oblivious Transfer (OT) according to the current subject matter is based on libOTe.

Modular Circuit Synthesis and Garbling: In the framework consistent with implementations of the current subject matter each layer is described as multiple invocations of a base circuit. For example, linear layers (CONV and FC) are described by a VDP circuit. Maxpool is described by an OR circuit where the number of inputs is the window size of the Maxpool layer. BA/BN layers are described using a comparison (CMP) circuit. The memory footprint is significantly reduced in this approach: only the base circuits are created and stored. As a result, the connection between two invocations of two different base circuits is handled at the software level.

Boolean circuits consistent with implementations of the current subject matter may be created using TinyGarble hardware synthesis approach. TinyGarble's technology libraries are optimized for GC and produce circuits that have low number of nonXOR gates. Boolean circuit description of the contemporary neural networks includes between millions to billions of Boolean gates, whereas synthesis tools cannot support circuits of this size. However, the modular design of the framework consistent with implementations of the current subject matter allows for the synthesis of each base circuit separately. Thus, the bottleneck transfers from the synthesis tool's maximum number of gates to the system's memory. As such, the framework effectively scales for any neural network complexity regardless of the limitations of the synthesis tool as long as enough memory (e.g., RAM) is available.

Pipelined GC Engine: According to aspects of the current subject matter, computation and communication are pipelined. For instance, consider a CONV layer followed by an activation layer. These layers are garbled and evaluated by multiple invocations of VDP and CMP circuits 710, 720 (one invocation per output neuron) as illustrated in diagram 700 of FIG. 7. Upon finishing the garbling process of layer L−1 702 the Garbler starts garbling the $L^{th}$ layer 704 and creates the random labels 712 for output wires of layer L 704. The garbler also needs to create the random labels 712 associated with the input (e.g., the weight parameters) to layer L. Given a set of input and output labels, the Garbler generates the garbled tables 714, and sends them to the evaluator as soon as one is ready. The Garbler also sends one of the two input labels (e.g., label selection 716) for input bits. At the same time, the evaluator has computed the output labels of the $(L−1)^{th}$ layer 702. The evaluator receives the garbled tables 714 as well as the Garbler's selected input labels 716 and decrypts the tables 714 and stores the output labels of layer L 704. The process is repeated for layer L+1 706, as shown in FIG. 7.

Dynamic Memory Management: The framework consistent with implementations of the current subject matter is designed such that the allocated memory for the labels is released as soon as it is no longer needed, reducing the memory usage significantly. For example, without the dynamic memory management according to aspects of the current subject matter, the Garbler had to allocate 10.41 GB for the labels and garbled tables for the entire garbling of BC1 network. In contrast, in the framework consistent with implementations of the current subject matter, the size of memory allocation in some instances never exceeds 2 GB and is less than 0.5 GB for most of the layers.

Application Programming Interface (API): The framework consistent with implementations of the current subject matter provides a simplified and easy-to-use API for oblivious inference. The framework accepts a high-level description of the network, parameters of each layer, and input structure. It automatically computes the number of invocations and the interconnection between all of the base circuits. Diagram 800 of FIG. 8 shows the complete network description that a user needs to write for a sample network architecture. All of the required circuits are automatically generated using TinyGarble synthesis libraries. For the task of oblivious inference, the API consistent with implementations of the current subject matter is much simpler compared to the recent high-level EzPC framework. For example, the required lines of code to describe BM1, BM2, and BM3 network architectures in EzPC are 78, 88, and 154, respectively. In contrast, they can be described with only 6, 6, and 10 lines of code in the framework consistent with implementations of the current subject matter.

Keras to framework translation: To further facilitate the adaptation of the framework according to aspects of the current subject matter, a compiler is created to translate the description of the neural network in Keras to the format of the framework according to aspects of the current subject matter. The compiler creates the framework file and puts the network parameters into the required format (e.g., HEX string) to be read by the framework during the execution of the GC protocol. All of the parameter adjustments are also automatically performed by the compiler.

High-Level Comparison: Aspects of the current subject matter incorporate a DL-secure computation co-design approach that provides an efficient solution but also maintains the constant round complexity regardless of the number of layers in the neural network model. It has been shown that round complexity is one of the important criteria in designing secure computation protocols since the performance can significantly be reduced in Internet settings where the network latency is high. Another important advantage of the solution according to aspects of the current subject matter is the ability to upgrade to the security against malicious adversaries using cut-and-choose techniques.

The framework consistent with implementations of the current subject matter was evaluated on MNIST and CIFAR10 datasets, which are two popular classification benchmarks used in prior work. In addition, four healthcare datasets were used to illustrate the applicability of the framework in real-world scenarios. For training the framework, Keras with Tensorflow back-end was used. The source code of the framework is compiled with GCC 5.5.0 using O3 optimization. All Boolean circuits are synthesized using Synopsys Design Compiler 2015. Evaluations are performed on (Ubuntu 16.04 LTS) machines with IntelCore i7-7700k and 32 GB of RAM. Consistent with prior frameworks, the benchmarks are evaluated in the LAN setting.

Evaluation on MNIST: There are mainly three network architectures that prior works have implemented for the MNIST dataset. These reference networks are converted into their binary counterparts and trained using the standard BNN training algorithm. Table 4 summarizes the architectures for the MNIST dataset.

TABLE 4

| Arch. | Previous Papers | Description |
|---|---|---|
| BM1 | SecureML [8], MiniONN [9] | 3 FC |
| BM2 | CryptoNets [14], MiniONN [9], DeepSecure [13], Chameleon [7] | 1 CONV, 2 FC |
| BM3 | MiniONN [9], EzPC [25] | 2 CONV, 2MP, 2FC |

Figure 9A:
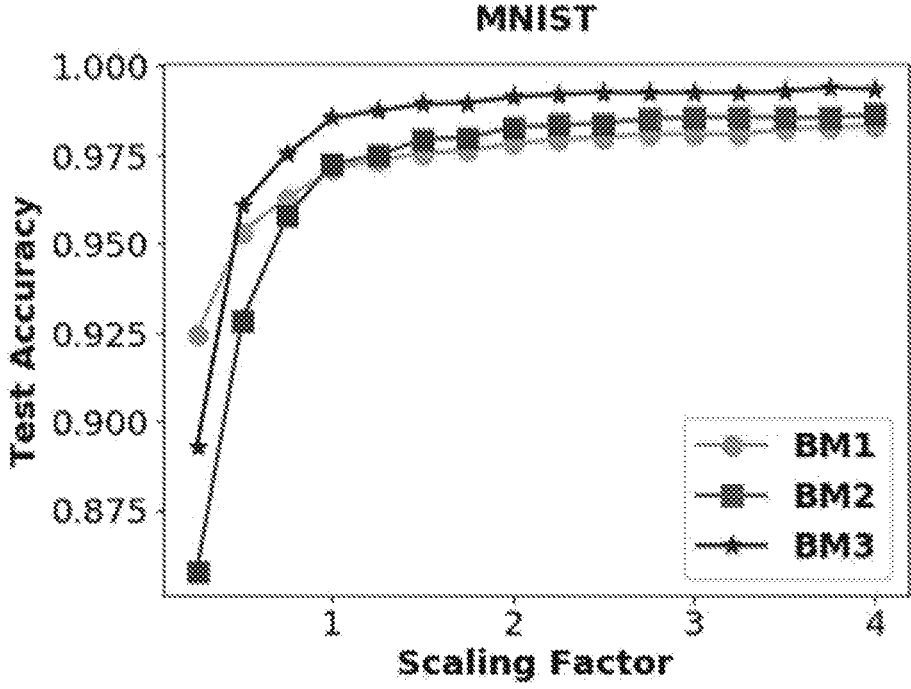
Figure 9B:
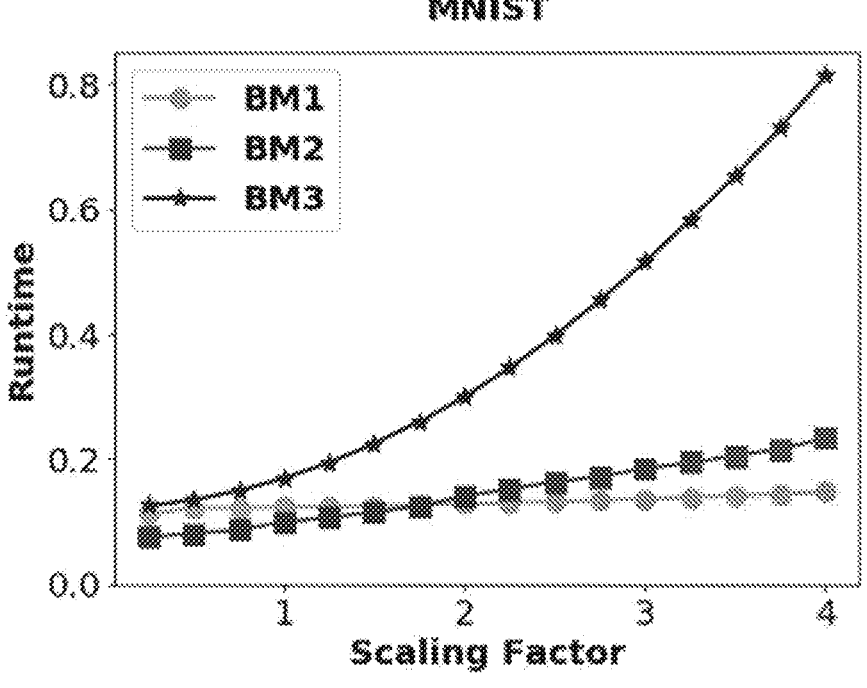

FIG. 9A depicts the inference accuracy with different scaling factors (without pruning). As the scaling factor is increased, the accuracy of the network increases. This accuracy improvement comes at the cost of a higher computational complexity of the (scaled) network. As a result, increasing the scaling factor leads to a higher runtime. FIG. 9B depicts the runtime of different BNN architectures as a function of the scaling factor s. Note that the runtime grows (almost) quadratically with the scaling factor due to the quadratic increase in the number of Popcount operations in the neural network. However, for the BM1 and BM2 networks, the overall runtime is dominated by the constant initialization cost of the OT protocol (about 70 milliseconds).

Figure 10A:
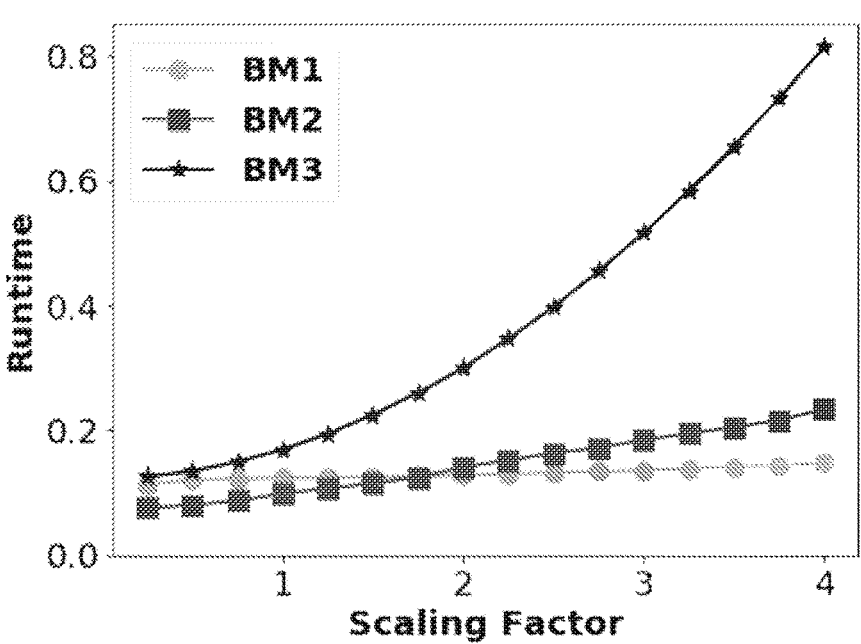
Figure 10B:
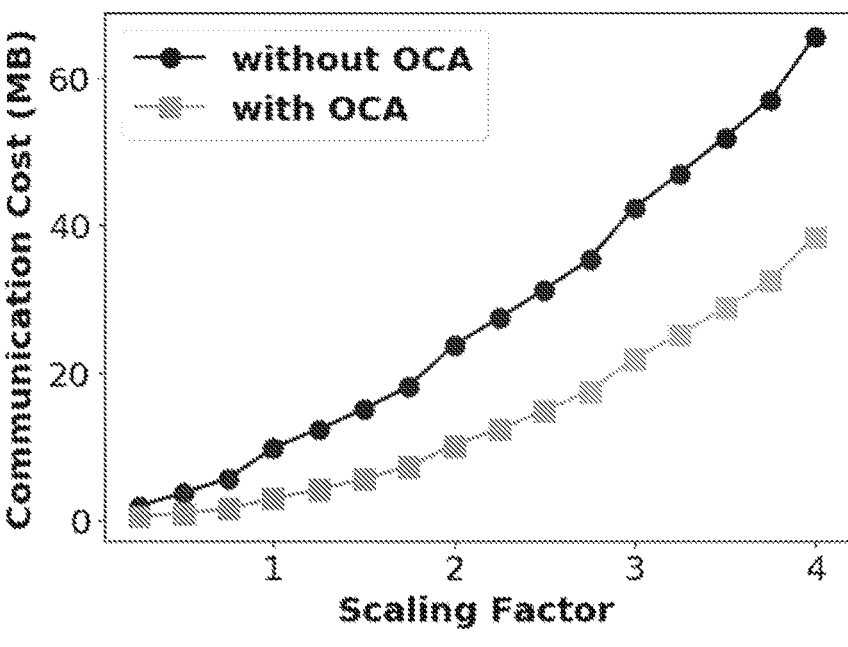

GC Cost and the Effect of OCA: The communication cost of GC is a key contributor to the overall runtime of the framework according to aspects of the current subject matter. The effect of the scaling factor on the total message size is analyzed. FIG. 10A and FIG. 10B illustrate the communication cost of GC for the BM1 and BM2 network architectures. As can be seen, the message size increases with the scaling factor. The OCA protocol drastically reduces the message size. This is due to the fact that the first layer of BM1 and BM2 models account for a large portion of the overall computation; hence, improving the first layer with OCA has a drastic effect on the overall communication.

The accuracy of the framework according to aspects of the current subject matter may be customized by tuning the scaling factor (s). Furthermore, the channel/neuron pruning step (Algorithm 2) may reduce the GC cost in a post-processing phase. To provide a fair comparison between the disclosed framework and prior work, a proper scaling factor is selected and the pertinent scaled BNN is trimmed such that the corresponding BNN achieves the same accuracy as the previous work. Table 5 compares the disclosed framework with the previous work in terms of accuracy, latency, and communication cost (a.k.a., message size). The last column shows the scaling factor (s) used to increase the width of the hidden layers of the BNN. Note that the scaled network is further trimmed using Algorithm 2 (Table 2).

TABLE 5

| Arch. | Framework | Runtime (s) | Comm. (MB) | Acc. (%) | s |
|---|---|---|---|---|---|
| BM1 | SecureML | 4.88 | — | 93.1 | — |
| | MiniONN | 1.04 | 15.8 | 97.6 | — |
| | EzPC | 0.7 | 76 | 97.6 | — |
| | Gazelle | 0.09 | 0.5 | 97.6 | — |
| | $X_{ONN}$ | 0.13 | 4.29 | 97.6 | 1.75 |
| BM2 | CryptoNets | 297.5 | 372.2 | 98.95 | — |
| | DeepSecure | 9.67 | 791 | 98.95 | — |
| | MiniONN | 1.28 | 47.6 | 98.95 | — |

TABLE 5-continued

| Arch. | Framework | Runtime (s) | Comm. (MB) | Acc. (%) | s |
|---|---|---|---|---|---|
| | Chameleon | 2.24 | 10.5 | 99.0 | — |
| | EzPC | 0.6 | 70 | 99.0 | — |
| | Gazelle | 0.29 | 8.0 | 99.0 | — |
| | $X_{ONN}$ | 0.16 | 38.28 | 98.64 | 4.00 |
| BM3 | MiniONN | 9.32 | 657.5 | 99.0 | — |
| | EzPC | 5.1 | 501 | 99.0 | — |
| | Gazelle | 1.16 | 70 | 99.0 | — |
| | $X_{ONN}$ | 0.15 | 32.13 | 99.0 | 2.00 |

According to aspects of the current subject matter, the runtime for oblivious transfer is at least about 0.07 seconds for initiating the protocol and then it grows linearly with the size of the garbled tables. As a result, in very small architectures such as BM1, the disclosed solution is slightly slower than previous works since the constant runtime dominates the total runtime. However, for the BM3 network which has higher complexity than BM1 and BM2, the disclosed framework achieves a more prominent advantage over prior work. In summary, the disclosed solution according to aspects of the current subject matter achieves up to 7.7 times faster inference (average of 3.4×) compared to Gazelle. Compared to MiniONN, the disclosed framework has up to 62 times lower latency (average of 26 times). Compared to EzPC, the disclosed framework is 34 times faster. In particular, the framework consistent with implementations of the current subject matter achieves 37.5 times, 1,859 times, 60.4 times, and 14 times better latency compared to SecureML, CryptoNets, DeepSecure, and Chameleon, respectively.

Evaluation on CIFAR10: In Table 6, the network architectures that are used for the CIFAR-10 dataset are summarized. In Table 6, BC1 is the binarized version of the architecture proposed by MiniONN. To evaluate the scalability to larger networks of the disclosed framework consistent with implementations of the current subject matter, the Fitnet architectures (denoted as BC2-BC5) are binarized. The framework consistent with implementations of the current subject matter is also evaluated on the VGG16 network architecture (BC6).

TABLE 6

| Arch. | Previous Papers | Description |
|---|---|---|
| BC1 | MiniONN[9], Chameleon [7], EzPC [25], Gazelle [10] | 7 CONV, 2 MP, 1 FC |
| BC2 | Fitnet [53] | 9 CONV, 3 MP, 1 FC |
| BC3 | Fitnet [53] | 9 CONV, 3 MP, 1 FC |
| BC4 | Fitnet [53] | 11 CONV, 3 MP, 1 FC |
| BC5 | Fitnet [53] | 17 CONV, 3 MP, 1 FC |
| BC6 | VGG16 [54] | 13 CONV, 5 MP, 3 FC |

Figure 11A:
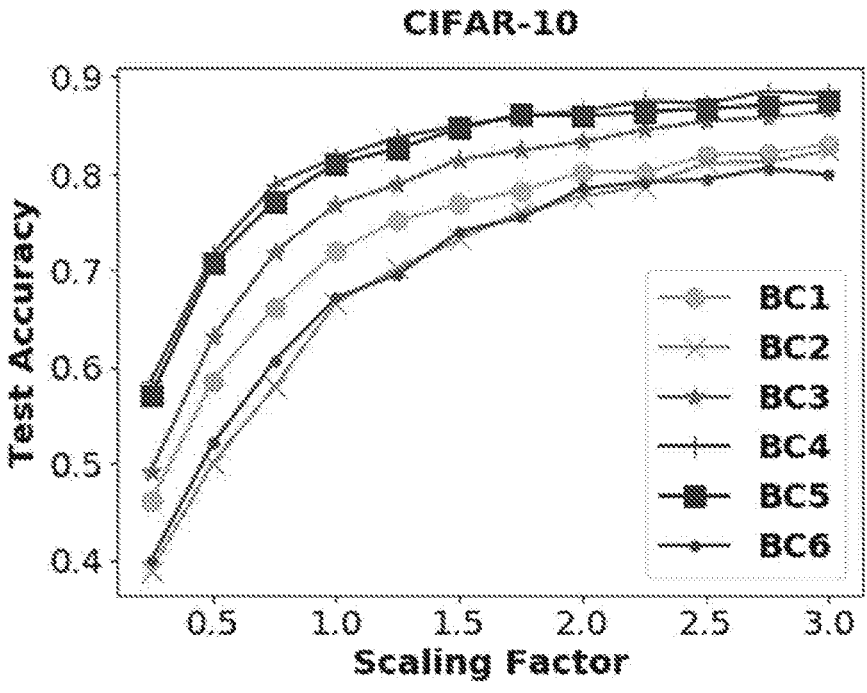
Figure 11B:
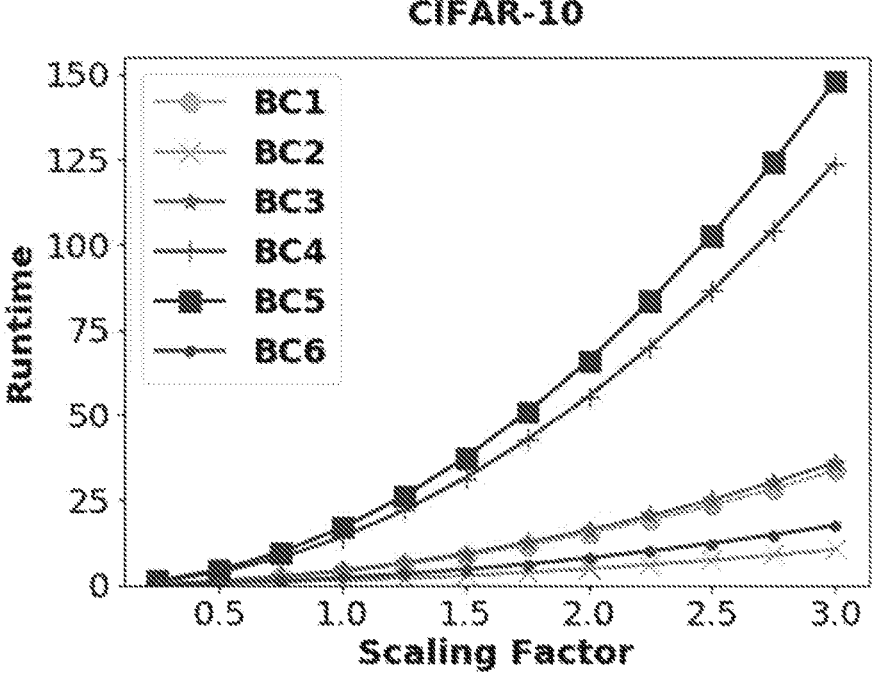

Analysis of Network Scaling: Similar to the analysis on the MNIST dataset, the accuracy of our binary models for CIFAR-10 can be tuned based on the scaling factor that determines the number of neurons in each layer. FIG. 11A depicts the accuracy of the BNNs with different scaling factors. As can be seen, increasing the scaling factor enhances the classification accuracy of the BNN. The runtime also increases with the scaling factor as shown in FIG. 11B.

The BC2 network was scaled with a factor of s=3, then pruned using Algorithm 2. The resulting network is compared against prior work in Table 7. As can be seen, the disclosed solution consistent with implementations of the current subject matter achieves 2.7 times, 45.8 times, 9.1 times, and 93.1 times lower latency compared to Gazelle, EzPC, Chameleon, and MiniONN, respectively.

TABLE 7

| Framework | Runtime (s) | Comm. (MB) | Acc. (%) | s |
|---|---|---|---|---|
| MiniONN | 544 | 9272 | 81.61 | — |
| Chameleon | 52.67 | 2650 | 81.61 | — |
| EzPC | 265.6 | 40683 | 81.61 | — |
| Gazelle | 15.48 | 1236 | 81.61 | — |
| $X_{ONN}$ | 5.79 | 2599 | 81.85 | 3.00 |

An important application of oblivious inference is medical data analysis. Recent advances in deep learning greatly benefit many complex diagnosis tasks that require exhaustive manual inspection by human experts. To showcase the applicability of oblivious inference in real-world medical applications, several benchmarks for publicly available healthcare datasets are summarized in Table 8. The datasets are split into validation and training portions as indicated in the last two columns of Table 8. All datasets except Malaria Infection are normalized to have 0 mean and standard deviation of 1 per feature. The images of Malaria Infection dataset are resized to 32×32 pictures. The normalized datasets are quantized up to three decimal digits. The validation accuracy along with inference time and message size are shown in Table 9.

TABLE 8

| Task | Arch. | Description | # of Samples | |
|---|---|---|---|---|
| | | | Tr. | Val. |
| Breast Cancer [59] | BH1 | 3 FC | 453 | 113 |
| Diabetes [60] | BH2 | 3 FC | 615 | 153 |
| Liver Disease [61] | BH3 | 3 FC | 467 | 116 |
| Malaria Infection [62] | BH4 | 2 CONV, 2 MP, 2 FC | 24804 | 2756 |

TABLE 9

| Arch. | Runtime (ms) | Comm. (MB) | Acc. (%) |
|---|---|---|---|
| BH1 | 82 | 0.35 | 97.35 |
| BH2 | 75 | 0.16 | 80.39 |
| BH3 | 81 | 0.3 | 80.17 |
| BH4 | 482 | 120.75 | 95.03 |

FIG. 12 depicts a block diagram 1200 depicting aspects of the framework consistent with implementations of the current subject matter. As shown, a secure protocol execution engine 1210 (labeled "GC Protocol Execution") interfaces between a client 1220 and a server 1230.

According to aspects of the current subject matter, a neural network architecture 1202 is modified for oblivious inference. In particular, parameters of the neural network architecture 1202 are modified such that the modified neural network architecture implements an oblivious inference protocol. The modification of the parameters may involve transforming the parameters such that input data is not disclosed to a server (e.g., the server 1230) executing the modified neural network architecture. Consistent with implementations of the current subject matter, a machine learning system in the form of a neural network representation is identified such that, together with a secure function evaluation framework, oblivious inference may be performed (e.g., inference without leaking information about the machine learning system other than the final output).

In particular, as described herein, an effective solution for oblivious inference takes into account the deep learning algorithms and optimization methods that can tailor the DL model for the security protocol. Consistent with implementations of the current subject matter, deep neural networks may be trained in which many bit-level operations are involved but no multiplications in the inference phase are involved. Moreover, the framework consistent with implementations of the current subject matter renders a constant round of interactions between the client 1220 and the server 1230, which has a significant effect on the performance on oblivious inference in network (e.g., Internet) settings.

According to aspects of the current subject matter, a combination of neural networks and garbled circuits (GC) is used for oblivious inference. The solution according to aspects of the current subject matter requires only a fixed number of interactions between the client 220 and the server 230, regardless of the number of layers in the neural network, in contrast to systems that may require one round of interaction per layer.

The modification of the neural network architecture 1202 may include transformation of the neural network architecture 1202 into a binary format (e.g., a binary neural network architecture 1204). Consistent with implementations of the current subject matter, scaling operations and pruning operations are incorporated such that the binary neural network architecture is scaled (1206) and pruned to result in a transformed binary neural network architecture 1208.

Consistent with implementations of the current subject matter, the scaled/pruned machine learning system is mapped into a secure protocol framework, such as the GC framework. The scaled/pruned machine learning system may be used for other secure computation protocols as well. As shown in FIG. 12, the transformed binary neural network architecture 1208 is represented as a Boolean circuit representation 1212. Transformation into the Boolean circuit representation 1212 for the GC protocol provides for execution of the transformed binary neural network architecture 1208 by the secure protocol execution engine 1210.

Consistent with implementations of the current subject matter, the secure protocol according to aspects of the current subject matter is an asynchronous implementation that allows for the computation to be broken down into components such that as soon as a micro-computation is finished, the result may be transferred and execution of the protocol may continue, as described herein with reference to FIG. 7. The asynchronous implementation of the secure protocol as provided herein may be used with various types of architectures and networks, and it not limited to a transformed binary neural network. The implementation consistent with implementations of the current subject matter may significantly reduce system memory usage on both sides, which may be a crucial factor in real-world computations. The reduction in system memory usage is achieved by the structure of the secure protocol execution engine 1210 and by the breakdown of the complex operations into many small-size but interlinked micro-operations.

As shown in FIG. 12, input data 1214 is provided by the client 1220 to the secure protocol execution engine 1210, which applies the input data 1214 to the Boolean circuit representation 1212 to generate output data 1216.

The oblivious conditional addition protocol according to aspects of the current subject matter provides for execution of the first layer of the transformed binary neural network architecture 1208 based on the oblivious transfer protocol. Consistent with implementations of the current subject matter, the oblivious conditional addition protocol enables two parties to securely execute vector dot product where one vector has binary values and the other vector is a set of integers. The oblivious conditional addition protocol according to aspects of the current subject matter may be used in any other secure or privacy-preserving application and is not limited to use with GC or for the task of neural network inference.

FIG. 13 depicts a flowchart 1300 illustrating a process consistent with implementations of the current subject matter.

At 1302, parameters of a neural network architecture are modified such that the modified neural network architecture implements an oblivious inference protocol. According to aspects of the current subject matter, the modification of the parameters includes transforming the parameters such that input data is not disclosed to a server (e.g., the server 1230) executing the modified neural network architecture.

As shown in FIG. 13, modifying the parameters of the neural network architecture may include but are not limited to the following. In particular, various modifications may be implemented consistent with implementations of the current subject matter such that the modified neural network architecture implements an oblivious inference protocol, and the current subject matter is not limited to a particular modification process.

At 1304, the neural network architecture is binarized to create a binary neural network architecture, where the binary neural network architecture includes layers having channels and neurons. For example, the neural network architecture may be binarized such that weights and activations have a binary value. This binarization, consistent with implementations of the current subject matter, allows for the subsequent representation of the network as a Boolean circuit representation for implementation with the GC protocol.

At 1306, the binary neural network architecture is adjusted by applying a factor variable to the channels and to the neurons of the layers. For example, the adjustment of the binary neural network architecture at 1306 may be considered a scaling operation that, consistent with implementations of the current subject matter, includes scaling the channels and neurons with a same factor variable. For example, according to aspects of the current subject matter, the number of channels and neurons in CONV and FC layers, respectively, are modified. Increasing the number of channels/neurons leads to a higher accuracy but it also increases the complexity of the corresponding GC circuit. As a result, the framework consistent with implementations of the current subject matter may provide a tradeoff between the accuracy and the communication/runtime of the oblivious inference. This tradeoff enables cloud servers to customize the complexity of the GC protocol to optimally match the computation and communication requirements of the clients. In the linear scaling step, prior to training, the number of channels/neurons in all BNN layers are scaled with the same factor (s) (e.g., s=2).

At 1308, redundant channels and neurons are removed from each layer of the binary neural network architecture. The removal of redundant channels and neurons may include, for example, ranking the channels and neurons based on a magnitude of gradient values of each of the channels and neurons, and removing, from each layer of the binary neural network architecture, the channels and neurons having a lowest magnitude of the ranked channels and/or neurons. According to aspects of the current subject matter, the removal of the channels and neurons having the lowest magnitude may be repeated until an accuracy falls below a predefined threshold value. According to aspects of the current subject matter, removing redundant channels and neurons from each layer of the binary neural network architecture may further include applying, in response to removing the channels and neurons having the lowest magnitude, training data to the binary neural network architecture.

Consistent with implementations of the current subject matter, the first layer of the binary neural network architecture may be executed by executing a vector dot product with the input data and a vector comprising binary values based on oblivious transfer. The vector dot product may be computed as a function of a bit-extended vector and a random vector, where the bit-extended vector may be created by bit-extending the input data, and where the random vector may include the vector having binary values. According to aspects of the current subject matter, the computation of the vector dot product may be based on a message provided by a sender, wherein the message includes one of a first message or a second message created by the sender as a function of the bit-extended vector and the random vector.

More specifically, consistent with implementations of the current subject matter, an oblivious conditional addition (OCA) protocol is provided in which the receiver (server) receives only one of the two messages from the sender. That is, based on each selection bit (a binary weight), the receiver gets an additive share of either the sender's number or its two's complement. Upon adding all of the received numbers, the receiver computes an additive share of the integer-VDP result. Even though the sender does not know which messages were selected by the receiver, the sender can add all of the randomly generated numbers r[i]s which is equal to the other additive share of the integer-VDP result. Since all numbers are described in the two's complement format, subtractions are equivalent to the addition of the two's complement values, which are created by the sender at the beginning of OCA. Moreover, it is possible that as values are accumulated, the bit-length of the final integer-VDP result grows accordingly. This is supported due to the bit-extension process at the beginning of the protocol. In other words, all additions are performed in a larger ring such that the result does not overflow. Note that all numbers belong to the ring $\mathbb{Z}_{2^{b'}}$ and by definition, a ring is closed under addition, therefore, yi and y2 are true additive shares of $y=y_1+y_2$ mod $2^{b'}$. All linear operations in the first layer of the DL model (either FC or CONV) can be formulated as a series of integer-VDPs. As described herein, the oblivious conditional addition protocol is not limited to a particular secure or privacy-preserving application, and does not need to be used with GC or for the task of neural network inference.

According to aspects of the current subject matter, a Boolean circuit representation of each layer of the binary neural network architecture may be created, where each Boolean circuit representation is created separately, and where each layer includes a plurality of micro-circuits forming the Boolean circuit representation. Each Boolean circuit representation may include a plurality of exclusive NOR gates. A binary activation function and/or a batch normalization layer of the binary neural network architecture may be defined by, for example, a comparison circuit.

A security protocol (such as GC) may be implemented to generate an output from the input being applied to the Boolean circuit representation. The implementation, consistent with implementations of the current subject matter, may include a randomizing operation and a decrypting operation for each layer. The randomizing operation and the decrypting operation may be performed in succession such that after one layer is randomized, the one layer is successively decrypted. The randomizing operation may include creating a randomized table for each gate in the Boolean circuit representation for each layer of the binary neural network architecture, where random output labels are encrypted using input labels according to a truth table of the gate. The input labels may include weight parameters of the binary neural network architecture.

The framework consistent with implementations of the current subject matter automatically trains and uses deep neural networks for the task of oblivious inference. Yao's Garbled Circuits (GC) protocol is utilized, and the DL models are binarized in order to translate costly matrix multiplications to XNOR operations that are free in the GC protocol. The proposed solution needs a constant round of interactions regardless of the number of layers. Maintaining constant round complexity is an important requirement in Internet settings as a typical network latency can significantly degrade the performance of oblivious inference. Moreover, as the proposed solution relies on the GC protocol, it can provide much stronger security guarantees such as security against malicious adversaries using standard cut-and-choose protocols. The framework's high-level API enables clients to utilize the framework with a minimal number of lines of code.

FIG. 14 depicts a block diagram illustrating a computing system 1400 consistent with implementations of the current subject matter. Referring to FIG. 14, the computing system 1400 can be used to implement the framework consistent with implementations of the current subject matter, and/or any components therein.

As shown in FIG. 14, the computing system 1400 can include a processor 1410, a memory 1420, a storage device 1430, and input/output devices 1440. The processor 1410, the memory 1420, the storage device 1430, and the input/output devices 1440 can be interconnected via a system bus 1450. The processor 1410 is capable of processing instructions for execution within the computing system 1400. Such executed instructions can implement one or more components of, for example, the framework consistent with implementations of the current subject matter. In some implementations of the current subject matter, the processor 1410 can be a single-threaded processor. Alternately, the processor 1410 can be a multi-threaded processor. The processor 1410 is capable of processing instructions stored in the memory 1420 and/or on the storage device 1430 to display graphical information for a user interface provided via the input/output device 1440.

The memory 1420 is a computer readable medium such as volatile or non-volatile that stores information within the computing system 1400. The memory 1420 can store data structures representing configuration object databases, for example. The storage device 1430 is capable of providing persistent storage for the computing system 1400. The storage device 1430 can be a floppy disk device, a hard disk device, an optical disk device, or a tape device, or other suitable persistent storage means. The input/output device 1440 provides input/output operations for the computing system 1400. In some implementations of the current subject matter, the input/output device 1440 includes a keyboard and/or pointing device. In various implementations, the input/output device 1440 includes a display unit for displaying graphical user interfaces.

According to some implementations of the current subject matter, the input/output device 1440 can provide input/output operations for a network device. For example, the input/output device 1440 can include Ethernet ports or other networking ports to communicate with one or more wired and/or wireless networks (e.g., a local area network (LAN), a wide area network (WAN), the Internet).

One or more aspects or features of the subject matter described herein can be realized in digital electronic circuitry, integrated circuitry, specially designed ASICs, field programmable gate arrays (FPGAs) computer hardware, firmware, software, graphics processing units (GPUs), dedicated circuits, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising: at least one data processor; and at least one memory storing instructions which, when executed by the at least one data processor, provide operations comprising: receiving input data; providing the input data to security protocol comprising a garbled circuits protocol configured to provide an oblivious inference protocol, wherein the input data is modified, via the security protocol, to a neural network architecture, which generates an output; modifying parameters of the neural network architecture to operate and provide the output using the such that the modified neural network architecture implements an oblivious inference protocol, wherein the modifying further comprises binarizing the neural network architecture to create a binary neural network architecture having weights and activations of a binary value, the binary neural network architecture comprising layers including channels and neurons, adjusting the binary neural network architecture by applying a factor variable to the channels and to the neurons of the layers of the binary neural network architecture, and removing redundant channels and neurons from each layer of the binary neural network architecture; wherein modifying the parameters further comprises transforming the input data parameters such that the input data is not discernible to a server executing the modified neural network architecture binary neural network architecture.

2. The system of claim 1 wherein removing redundant channels and neurons from each layer of the binary neural network architecture comprises: ranking the channels and neurons based on a magnitude of gradient values of each of the channels and neurons; and removing, from each layer of the binary neural network architecture, the channels and neurons having a lowest magnitude of the ranked channels and/or neurons.

3. The system of claim 2, wherein removing the channels and neurons having the lowest magnitude is repeated until an accuracy falls below a predefined threshold value.

4. The system of claim 1, wherein the at least one memory storing instructions which, when executed by the at least one data processor, provide operations further comprising: executing a first layer of the binary neural network architecture by executing a vector dot product with the input data and a vector comprising binary values based on oblivious transfer.

5. The system of claim 1, wherein the at least one memory storing instructions which, when executed by the at least one data processor, provide operations further comprising: creating a Boolean circuit representation of each layer of the binary neural network architecture, wherein each Boolean circuit representation is created separately, and wherein each layer comprises a plurality of micro-circuits forming the Boolean circuit representation.

6. The system of claim 1, wherein implementing the security protocol to generate the output comprises a randomizing operation and a decrypting operation for each layer, wherein the randomizing operation and the decrypting operation are performed in succession such that after one layer is randomized, the one layer is successively decrypted, wherein the randomizing operation comprises creating a randomized table for each gate in the Boolean circuit representation for each layer of the binary neural network architecture, wherein random output labels are encrypted using input labels according to a truth table of the gate.

7. A method, comprising: receiving input data; providing the input data to security protocol comprising a garbled circuits protocol configured to provide an oblivious inference protocol, wherein the input data is modified, via the security protocol, to a neural network architecture, which generates an output; modifying parameters of the neural network architecture to operate and provide the output using the such that the modified neural network architecture implements an oblivious inference protocol, wherein the modifying further comprises binarizing the neural network architecture to create a binary neural network architecture having weights and activations of a binary value, the binary neural network architecture comprising layers including channels and neurons, adjusting the binary neural network architecture by applying a factor variable to the channels and to the neurons of the layers of the binary neural network architecture, and removing redundant channels and neurons from each layer of the binary neural network architecture; wherein modifying the parameters further comprises transforming the input data parameters such that input data is not discernible to a server executing the binary neural network architecture modified neural network architecture.

8. The method of claim 7, wherein removing redundant channels and neurons from each layer of the binary neural network architecture comprises: ranking the channels and neurons based on a magnitude of gradient values of each of the channels and neurons; and removing, from each layer of the binary neural network architecture, the channels and neurons having a lowest magnitude of the ranked channels and/or neurons.

9. The method of claim 8, wherein removing the channels and neurons having the lowest magnitude is repeated until an accuracy falls below a predefined threshold value.

10. The method of claim 7, further comprising: executing a first layer of the binary neural network architecture by executing a vector dot product with the input data and a vector comprising binary values based on oblivious transfer.

11. The method of claim 7, further comprising: creating a Boolean circuit representation of each layer of the binary neural network architecture, wherein each Boolean circuit representation is created separately, and wherein each layer comprises a plurality of micro-circuits forming the Boolean circuit representation.

12. The method of claim 7, wherein implementing the security protocol to generate the output comprises a randomizing operation and a decrypting operation for each layer, wherein the randomizing operation and the decrypting operation are performed in succession such that after one layer is randomized, the one layer is successively decrypted, wherein the randomizing operation comprises creating a randomized table for each gate in the Boolean circuit representation for each layer of the binary neural network architecture, wherein random output labels are encrypted using input labels according to a truth table of the gate.

13. A non-transitory computer-readable storage medium including program code, which when executed by at least one data processor, causes operations comprising: receiving input data; providing the input data to security protocol comprising a garbled circuits protocol configured to provide an oblivious inference protocol, wherein the input data is modified, via the security protocol, to a neural network architecture, which generates an output; modifying parameters of the neural network architecture to operate and provide the output using the such that the modified neural network architecture implements an oblivious inference protocol, wherein the modifying further comprises binarizing the neural network architecture to create a binary neural network architecture having weights and activations of a binary value, the binary neural network architecture comprising layers including channels and neurons, adjusting the binary neural network architecture by applying a factor variable to the channels and to the neurons of the layers of the binary neural network architecture, and removing redundant channels and neurons from each layer of the binary neural network architecture; wherein modifying the parameters further comprises transforming the input data parameters such that input data is not discernible to a server executing the binary neural network architecture modified neural network architecture.

* * * * *